US007123341B2

(12) United States Patent
Ono

(10) Patent No.: US 7,123,341 B2
(45) Date of Patent: Oct. 17, 2006

(54) IMAGE RECORDING APPARATUS

(75) Inventor: Takehisa Ono, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 100 days.

(21) Appl. No.: 10/852,152

(22) Filed: May 25, 2004

(65) Prior Publication Data

US 2004/0240880 A1 Dec. 2, 2004

(30) Foreign Application Priority Data

May 26, 2003 (JP) ............................ 2003-147153

(51) Int. Cl.
*G03B 27/52* (2006.01)

(52) U.S. Cl. ............................ 355/27; 355/29; 355/99; 396/612

(58) Field of Classification Search ..................... None
See application file for complete search history.

(56) References Cited

U.S. PATENT DOCUMENTS 5,493,363 A * 2/1996 Morita ........................ 355/99
6,160,608 A * 12/2000 Kimura ........................ 355/29
6,343,787 B1 * 2/2002 Kato et al. .................. 271/274

FOREIGN PATENT DOCUMENTS

JP 2000-206638 7/2000

* cited by examiner

*Primary Examiner*—D. Rutledge
(74) *Attorney, Agent, or Firm*—Sughrue Mion, PLLC

(57) ABSTRACT

Operating speed of an image recording apparatus is optimized within the range in which throughput capacity is not decreased, and exposure processing can be performed so that uneven exposure is not generated in a photosensitive material. When operation causing the photosensitive material to be in a nip state or a nip released state is performed during scanning exposure of the photosensitive material with a light beam, assuming that a maximum value of ascent/descent speed is set to W when each roller comes into contact with the photosensitive material or separates from the photosensitive material, an exposure angle is set to θ, and exposure feeding linear speed is set to V, a drive controlling section sets the ascent/descent speed W to a value determined from an equation of $W=V\times0.004/\tan\theta$ and performs moving action.

11 Claims, 11 Drawing Sheets

IMAGE RECORDING APPARATUS

CROSS-REFERENCE TO RELATED APPLICATION

This application claims priority under 35 USC 119 from Japanese Patent Application No. 2003-147153, the disclosure of which is incorporated by reference herein.

BACKGROUND OF THE INVENTION

1. Field of the Invention

The present invention relates to an image recording apparatus which exposes a photosensitive material to for an image.

2. Description of the Related Art

A digital photo printer becomes commercially practical as a printing device utilizing a digital exposure technology. In the digital photo printer, the image recorded in a film is photoelectrically read, the read image is converted into a digital signal, various kinds of image processings are performed to obtain image data for recording, scanning exposure is performed to a photographic paper with a recording light beam modulated according to the image data to record the image (latent image), and development processing is performed to the latent image to output a print (photograph).

Basically the digital photo printer includes an input machine having a scanner (image reading device) and an image processing device and an output machine having the printing device (image recording apparatus) and a developing device.

In the scanner, projection light of the image taken in the film is photoelectrically read by an image sensor such as CCD and transmitted in the form of the image data (image data signal) of the film to the image processing device. In the image processing device, the predetermined image processing is performed to the image data and transmitted in the form of output image data for image recording (exposure condition) to the printing device.

With reference to the printing device, for example, in the case where the printing device is one which utilizes the light beam scanning exposure, the scanning exposure is performed to the photographic paper with the light beam to form the latent image in such a manner that the photographic paper is scanned and fed in a sub-scanning direction orthogonal to a main scanning direction while the light beam modulated according to the supplied image data is deflected in the main scanning direction. On the occasion, the back print is recorded on the back side of photographic paper, and it is sent to the developing device.

In the developing device, the predetermined development processing and the like are performed to the exposed photographic paper to make the print in which the image taken in the film is reproduced.

In the image recording apparatus, after a long sheet of the photographic paper wound in a roll shape is cut in a predetermined length to form one sheet-like photographic paper, the image recording is continuously performed in such a manner that the main scanning of the photographic paper is performed with the light beam while the photographic paper is fed in the sub-scanning direction.

In the image recording apparatus, two pairs of feeding rollers are provided on an upstream side and a downstream-side in a feeding direction while sandwiching an exposure position. During the image recording, the two pairs of feeding rollers feed the photographic paper while maintaining planarity of the photographic paper by nipping the photographic paper.

In the image recording apparatus, in order to secure the planarity of the photographic paper at the exposure position, it is desirable that the pairs of feeding rollers, which are arranged in immediately before and immediately after the exposure position, are approximated to the exposure position as much as possible. However, there is a limitation of the approximation to the exposure position due to a size of roller diameter of the pair of feeding rollers and the arrangement and structure of a driving system for driving the pair of rollers.

Accordingly, in the image recording apparatus, there is a possibility that uneven exposure is generated, because a front end of the photographic paper becomes free and the photographic paper is curled after the front end of the photographic paper passes through the pair of feeding rollers located on the upstream side of the exposure position in the feeding direction until the front end of the photographic paper reaches the pair of feeding rollers located on the downstream side of the exposure position in the feeding direction.

Therefore, in the conventional image recording apparatus, as illustrated in FIG. 13, a sheet-like photographic paper A is nipped by a pair of feeding rollers 100 on the upstream side in the feeding direction and a pair of feeding rollers 102 on the downstream side, which are located across an exposure position P, thereby the photographic paper is accurately fed. Further, while a flatter guide 104 supports a back surface of the photographic paper A in the vicinity of the exposure position P, a pressing roller 106 provided between the pair of feeding rollers 100 and the exposure position P abuts on an emulsion surface of the photographic paper A. As a result, the photographic paper A is prevented from rising, and the image recording is performed well.

In the conventional image recording apparatus, in the case where the photographic paper A having a predetermined thickness enters the position between the pair of feeding rollers 100 on the upstream side in the feeding direction, between the pair of feeding rollers 102 on the downstream side in the feeding direction, or between the flatter guide 104 and the pressing roller 106 and in the case where the photographic paper leaves the position between the pair of feeding rollers 100 on the upstream side in the feeding direction, between the pair of feeding rollers 102 on the downstream side in the feeding direction, or between the flatter guide 104 and the pressing roller 106, sometimes the uneven exposure (uneven print density) is generated due to a fluctuation in load which is caused by shock, vibration, position shift, or the like.

Therefore, there has been proposed an image recording apparatus in which, in order to prevent the uneven exposure (uneven print density) generated by the fluctuation in load which is caused by the shock, when the photographic paper A enters and leaves the pair of feeding rollers 100, the pair of feeding rollers 102, or the pressing roller 106, while movable nipping rollers constituting the pairs of feeding rollers 100 and 102 are retracted from fixed rollers of the pairs of feeding rollers 100 and 102, the pressing roller 106 is separated from the flatter guide 104 to prevent from generating the shock (for example, see Japanese Patent Application Laid-Open (JP-A) No. 2000-206638).

In the image recording apparatus described in JP-A No. 2000-206638, when the photographic paper A enters and leaves the pair of feeding rollers 100, the pair of feeding rollers 102, or the pressing roller 106, even if the pressing roller 106 is separated from the flatter guide 104 while the movable nipping rollers are retracted from the fixed rollers, in the case where clearance (separation distance) is small in the separating action, the end portion of the curled photographic paper A collides with the roller to generate the fluctuation in load. As a result, there is a possibility that the high-quality print can not be obtained because the uneven exposure is generated.

In the image recording apparatus described above, when the photographic paper A is placed on the fixed roller, the movable nipping roller is pressed against the photographic paper A to nip the photographic paper A, or the movable nipping roller is separated from the photographic paper A. When the photographic paper A is placed on the flatter guide 104, the pressing roller 106 is pressed against the photographic paper A to nip the photographic paper A, or the pressing roller 106 is separated from the photographic paper A.

In the image recording apparatus described above, when action speed is too fast in pressing the movable nipping roller against the photographic paper A or in separating the movable nipping roller from the photographic paper A, or when the action speed is too fast in pressing the pressing roller 106 against the photographic paper A or in separating the pressing roller 106 from the photographic paper A, there is a possibility that the uneven exposure (uneven print density) is generated by the fluctuation in load. Further, in the image recording apparatus described above, when the action speed becomes slow in pressing the movable nipping roller or the pressing roller 106 against the photographic paper A or in separating the movable nipping roller or the pressing roller 106 from the photographic paper A, there is a problem that exposure processing speed is decreased to decrease the throughput capacity.

SUMMARY OF THE INVENTION

In view of the foregoing, it is an object of the present invention to newly provide the image recording apparatus which, in the case where the photosensitive material enters and leaves each roller, sets the clearance (separation distance) so that the end portion of the photosensitive material does not collide with each roller when the separating action is performed so as to release the nip state, and optimizes the action speed so that the throughput capacity is not decreased within the range in which the fluctuation in load does not become the problem-when the photosensitive material is nipped or released from the nip state, thereby the image recording apparatus has an advantage in which the exposure processing can be performed well.

An image recording apparatus of a first aspect of the invention is one in which scanning exposure is performed to a sheet-like photosensitive material at an exposure position with light beam to record an image, the image recording apparatus comprising: a first feeding nip roller which is arranged on an upstream side of the exposure position in a feeding direction and attached while the first feeding nip roller is movable between a nip state and a nip released state, the first feeding nip roller feeding the photosensitive material; a first guide nip roller which is arranged between the exposure position and the first feeding nip roller and attached while the first guide nip roller is movable between the nip state and the nip released state, the first guide nip roller suppressing a rise of the photosensitive material; a second feeding nip roller which is arranged on a downstream side of the exposure position in the feeding direction and attached while the second feeding nip roller is movable between the nip state and the nip released state, the second feeding nip roller feeding the photosensitive material; a second guide nip roller which is arranged between the exposure position and the second feeding nip roller and attached while the second guide nip roller is movable between the nip state and the nip released state, the second guide nip roller suppressing the rise of the photosensitive material; and a drive controlling section which moves the first feeding nip roller, the first guide nip roller, the second feeding nip roller, or the second guide nip roller to the nip state and the nip released state, the drive controlling section setting ascent/descent speed W to a value determined from an equation of $W=V\times 0.004/\tan\theta$, where W is a maximum value of ascent/descent speed when the first feeding nip roller, the first guide nip roller, the second feeding nip roller, or the second guide nip roller comes into contact with the photosensitive material or separates from the photosensitive material, θ (tan θ) is an exposure angle, and V is exposure feeding linear speed.

Here, the exposure angle is an angle formed between the light beam and a direction perpendicular to the feeding direction of the photosensitive material.

According to the above configuration, the drive controlling section feeds the photosensitive material fed while causing the first feeding nip roller and the second feeding nip roller to be in the nip state at proper timing, and the drive controlling section simultaneously controls so as to suppress the rise of the photosensitive material while causing the first guide nip roller and the second guide nip roller to be in the nip state at proper timing. Therefore, the scanning exposure can be performed to the photosensitive material with the light beam to record the image having no unevenness.

When the front end or the back end in the feeding direction of the photosensitive material passes through each position of the first feeding nip roller, the second feeding nip roller, the first guide nip roller, and the second guide nip roller, in order to prevent the vibration or the fluctuation in feeding load which is generated when the front end or the back end of the photosensitive material passes through each roller, the drive controlling section performs the control causing the first feeding nip roller, the second feeding nip roller, the first guide nip roller, and the second guide nip roller to be in the nip released state or the nip state at proper timing. Therefore, the scanning exposure can be performed to the photosensitive material with the light beam to record the image having no unevenness.

Further, it is assumed that the maximum value of ascent/descent speed is set to W, when the drive controlling section causes each of the first feeding nip roller, the second feeding nip roller, the first guide nip roller, and the second guide nip roller to come into contact with the photosensitive material or to be separated from the photosensitive material, in order that each of the first feeding nip roller, the second feeding nip roller, the first guide nip roller, and the second guide nip roller is caused to be in the nip released state or the nip state during performing the scanning exposure to the photosensitive material with the light beam. The ascent/descent speed W is optimized so that throughput capability is not decreased, the unevenness generated by the address shift is suppressed within the permissible range of visibility when each roller comes into contact with the photosensitive material or is separated from the photosensitive material, the uneven exposure is prevented from standing out in the latent image formed in the photosensitive material, and throughput capability is prevented from decreasing.

An image recording apparatus of a second aspect of the invention is one in which scanning exposure is performed to a sheet-like photosensitive material at an exposure position with light beam to record an image, the image recording apparatus comprising: a first feeding nip roller which is arranged on an upstream side of the exposure position in a feeding direction and attached while the first feeding nip roller is movable between a nip state and a nip released state, the first feeding nip roller feeding the photosensitive material; a first guide nip roller which is arranged between the exposure position and the first feeding nip roller and attached while the first guide nip roller is movable between the nip state and the nip released state, the first guide nip roller suppressing a rise of the photosensitive material; a second feeding nip roller which is arranged on a downstream side of the exposure position in the feeding direction and attached while the second feeding nip roller is movable between the nip state and the nip released state, the second feeding nip roller feeding the photosensitive material; a second guide nip roller which is arranged between the exposure position and the second feeding nip roller and attached while the second guide nip roller is movable between the nip state and the nip released state, the second guide nip roller suppressing the rise of the photosensitive material; and a drive controlling section which moves the first feeding nip roller, the first guide nip roller, the second feeding nip roller, or the second guide nip roller to the nip state and the nip released state, the drive controlling section performing control operation moving the second guide nip roller and the second feeding nip roller to a state in which a gap is provided when a front end of the photosensitive material in exposure passes through positions of the second guide nip roller and the second feeding nip roller which are located on the downstream side of the exposure position in the feeding direction, the gap being capable of passing the front end of the photosensitive material without contacting the second guide nip roller and the second feeding nip roller and being more than an amount of curl of the photosensitive material.

According to the above configuration, the drive controlling section feeds the photosensitive material fed while causing the first feeding nip roller and the second feeding nip roller to be in the nip state at proper timing, and the drive controlling section simultaneously controls so as to suppress the rise of the photosensitive material while causing the first guide nip roller and the second guide nip roller to be in the nip state at proper timing. Therefore, the scanning exposure can be performed to the photosensitive material with the light beam to record the image having no unevenness.

When the front end in the feeding direction of the photosensitive material passes through the positions of the second feeding nip roller and the second guide nip roller which are located on the downstream side of the exposure position in the feeding direction during performing the scanning exposure to the photosensitive material with the light beam, since the second feeding nip roller and the second guide nip roller are retracted to the state in which the gap more than the amount of curl of the photosensitive material is provided in both the second feeding nip roller and the second guide nip roller, the front end of the photosensitive material can be prevented from coming into contact with the second feeding nip roller and the second guide nip roller, even if the photosensitive material is curled.

Therefore, the uneven exposure can be prevented from generating in the latent image formed in the photosensitive material. The uneven exposure is caused by the vibration or the fluctuation in feeding load, which is generated in such a manner that the front end of the photosensitive material comes into contact with the second feeding nip roller and the second guide nip roller.

An image recording apparatus of a third aspect of the invention is one in which scanning exposure is performed to a sheet-like photosensitive material at an exposure position with light beam to record an image, the image recording apparatus comprising: a first feeding nip roller which is arranged on an upstream side of the exposure position in a feeding direction and attached while the first feeding nip roller is movable between a nip state and a nip released state, the first feeding nip roller feeding the photosensitive material; a first guide nip roller which is arranged between the exposure position and the first feeding nip roller and attached while the first guide nip roller is movable between the nip state and the nip released state, the first guide nip roller suppressing a rise of the photosensitive material; a second feeding nip roller which is arranged on a downstream side of the exposure position in the feeding direction and attached while the second feeding nip roller is movable between the nip state and the nip released state, the second feeding nip roller feeding the photosensitive material; a second guide nip roller which is arranged between the exposure position and the second feeding nip roller and attached while the second guide nip roller is movable between the nip state and the nip released state, the second guide nip roller suppressing the rise of the photosensitive material; and a drive controlling section which moves the first feeding nip roller, the first guide nip roller, the second feeding nip roller, or the second guide nip roller to the nip state and the nip released state, the drive controlling section performing control operation moving the first feeding nip roller and the first guide nip roller to a state in which a gap is provided when a back end of the photosensitive material in exposure passes through positions of the first feeding nip roller and the first guide nip roller which are located on the upstream side of the exposure position in the feeding direction, the gap being capable of passing the back end of the photosensitive material without contacting the first feeding nip roller and the first guide nip roller and being more than an amount of curl of the photosensitive material.

According to the above configuration, the drive controlling section feeds the photosensitive material fed while causing the first feeding nip roller and the second feeding nip roller to be in the nip state at proper timing, and the drive controlling section simultaneously controls so as to suppress the rise of the photosensitive material while causing the first guide nip roller and the second guide nip roller to be in the nip state at proper timing. Therefore, the scanning exposure can be performed to the photosensitive material with the light beam to record the image having no unevenness.

When the front end in the feeding direction of the photosensitive material passes through the positions of the first feeding nip roller and the first guide nip roller which are located on the upstream side of the exposure position in the feeding direction during performing the scanning exposure to the photosensitive material with the light beam, since the first feeding nip roller and the first guide nip roller are retracted to the state in which the gap more than the amount of curl of the photosensitive material is provided in both the first feeding nip roller and the first guide nip roller, the back end of the photosensitive material can be prevented from coming into contact with the first feeding nip roller and the first guide nip roller, even if the photosensitive material is curled.

Therefore, the uneven exposure can be prevented from generating in the latent image formed in the photosensitive material. The uneven exposure is caused by the vibration or the fluctuation in feeding load, which is generated in such a manner that the back end of the photosensitive material comes into contact with the first feeding nip roller and the first guide nip roller.

An image recording apparatus of a fourth aspect of the invention is one in which scanning exposure is performed to a sheet-like photosensitive material at an exposure position with light beam to record an image, the image recording apparatus comprising: a first feeding nip roller which is arranged on an upstream side of the exposure position in a feeding direction and attached while the first feeding nip roller is movable between a nip state and a nip released state, the first feeding nip roller feeding the photosensitive material; a first guide nip roller which is arranged between the exposure position and the first feeding nip roller and attached while the first guide nip roller is movable between the nip state and the nip released state, the first guide nip roller suppressing a rise of the photosensitive material; a second feeding nip roller which is arranged on a downstream side of the exposure position in the feeding direction and attached while the second feeding nip roller is movable between the nip state and the nip released state, the second feeding nip roller feeding the photosensitive material; a second guide nip roller which is arranged between the exposure position and the second feeding nip roller and attached while the second guide nip roller is movable between the nip state and the nip released state, the second guide nip roller suppressing the rise of the photosensitive material and a drive controlling section which moves the first feeding nip roller, the first guide nip roller, the second feeding nip roller, or the second guide nip roller to the nip state and the nip released state, the drive controlling section performing control operation moving the first guide nip roller to the nip state before a front end of the photosensitive material passes through a position of the first guide nip roller which is located on the upstream side of the exposure position in the feeding direction.

According to the above configuration, the drive controlling section feeds the photosensitive material fed while causing the first feeding nip roller and the second feeding nip roller to be in the nip state at proper timing, and the drive controlling section simultaneously controls so as to suppress the rise of the photosensitive material while causing the first guide nip roller and the second guide nip roller to be in the nip state at proper timing. Therefore, the scanning exposure can be performed to the photosensitive material with the light beam to record the image having no unevenness.

When the front end in the feeding direction of the photosensitive material reaches the position of the first guide nip roller which is located on the upstream side of the exposure position in the feeding direction, the photosensitive material is nipped from the front end by the first guide nip roller which is in the nip state. At this point, the vibration and the fluctuation in feeding load are generated in the photosensitive material. However, there is no possibility that the uneven exposure is generated in the latent image because the photosensitive material is not in exposure.

When the photosensitive material reaches the exposure position, since the photosensitive material has been already nipped by the first guide nip roller, it is not necessary that the first guide nip roller is moved to the nip state during the exposure of the photosensitive material. Therefore, the uneven exposure can be prevented from generating in the latent image formed in the photosensitive material. The uneven exposure is caused by the vibration or the fluctuation in feeding load, which is generated in such a manner that the first guide nip roller abuts on the photosensitive material in exposure so as to nip the photosensitive material.

An image recording apparatus of a fifth aspect of the invention is one in which scanning exposure is performed to a sheet-like photosensitive material at an exposure position with light beam to record an image, the image recording apparatus comprising: a first feeding nip roller which is arranged on an upstream side of the exposure position in a feeding direction and attached while the first feeding nip roller is movable between a nip state and a nip released state, the first feeding nip roller feeding the photosensitive material; a first guide nip roller which is arranged between the exposure position and the first feeding nip roller and attached while the first guide nip roller is movable between the nip state and the nip released state, the first guide nip roller suppressing a rise of the photosensitive material; a second feeding nip roller which is arranged on a downstream side of the exposure position in the feeding direction and attached while the second feeding nip roller is movable between the nip state and the nip released state, the second feeding nip roller feeding the photosensitive material; a second guide nip roller which is arranged between the exposure position and the second feeding nip roller and attached while the second guide nip roller is movable between the nip state and the nip released state, the second guide nip roller suppressing the rise of the photosensitive material; and a drive controlling section which moves the first feeding nip roller, the first guide nip roller, the second feeding nip roller, or the second guide nip roller to the nip state and the nip released state, the drive controlling section performing control operation moving the second guide nip roller to the nip state until a back end of the photosensitive material passes through a position of the second guide nip roller which is located on the downstream side of the exposure position in the feeding direction.

According to the above configuration, the drive controlling section feeds the photosensitive material fed while causing the first feeding nip roller and the second feeding nip roller to be in the nip state at proper timing, and the drive controlling section simultaneously controls so as to suppress the rise of the photosensitive material while causing the first guide nip roller and the second guide nip roller to be in the nip state at proper timing. Therefore, the scanning exposure can be performed to the photosensitive material with the light beam to record the image having no unevenness.

The second guide nip roller is held in the nip state until the back end of the photosensitive material in the feeding direction passes through the position of the second guide nip roller which is located on the downstream side of the exposure position in the feeding direction. Therefore, during the exposure of the photosensitive material at the exposure position, the photosensitive material is securely nipped by the second guide nip roller and held in the state in which the rise of the photosensitive material is suppressed, so that the image having no unevenness can be recorded in the photosensitive material.

When the back end in the feeding direction of the photosensitive material passes through the position of the second guide nip roller which is arranged on the downstream side of the exposure position in the feeding direction and is in the nip state, the vibration and the fluctuation in feeding load are generated in the photosensitive material. However, there is no possibility that the uneven exposure is generated in the latent image because the photosensitive material is not in exposure.

An image recording apparatus of a sixth aspect of the invention is one in which scanning exposure is performed to a sheet-like photosensitive material at an exposure position with light beam to record an image, the image recording apparatus comprising: a first feeding nip roller which is arranged on an upstream side of the exposure position in a feeding direction and attached while the first feeding nip roller is movable between a nip state and a nip released state, the first feeding nip roller feeding the photosensitive material; a first guide nip roller which is arranged between the exposure position and the first feeding nip roller and attached while the first guide nip roller is movable between the nip state and the nip released state, the first guide nip roller suppressing a rise of the photosensitive material; a second feeding nip roller which is arranged on a downstream side of the exposure position in the feeding direction and attached while the second feeding nip roller is movable between the nip state and the nip released state, the second feeding nip roller feeding the photosensitive material; a second guide nip roller which is arranged between the exposure position and the second feeding nip roller and attached while the second guide nip roller is movable between the nip state and the nip released state, the second guide nip roller suppressing the rise of the photosensitive material; and a drive controlling section which moves the first feeding nip roller, the first guide nip roller, the second feeding nip roller, or the second guide nip roller to the nip state and the nip released state, the drive controlling section performing control operation moving the first feeding nip roller, the first guide nip roller, the second feeding nip roller, and the second guide nip roller so as to be in the nip released when the first feeding nip roller, the first guide nip roller, the second feeding nip roller, or the second guide nip roller are returned to an initial position respectively.

According to the above configuration, the drive controlling section feeds the photosensitive material fed while causing the first feeding nip roller and the second feeding nip roller to be in the nip state at proper timing, and the drive controlling section simultaneously controls so as to suppress the rise of the photosensitive material while causing the first guide nip roller and the second guide nip roller to be in the nip state at proper timing. Therefore, the scanning exposure can be performed to the photosensitive material with the light beam to record the image having no unevenness.

When each of the first feeding nip roller, the second feeding nip roller, the first guide nip roller, and the second guide nip roller is returned to the initial position, the drive controlling section causes each roller to move to the nip released state. Only in the case where each of the first feeding nip roller, the second feeding nip roller, the first guide nip roller, and the second guide nip roller is required for use, the drive controlling section causes each roller to be in the nip state. Therefore, even if the so-called default state in which the each roller is on standby at the initial position continues for a long time, deformation of the first feeding nip roller, the second feeding nip roller, the first guide nip roller, and the second guide nip roller can be prevented from generating. The deformation of each roller is generated by leaving each roller in a pressing state (nip state).

In a seventh aspect of the present invention, the drive controlling section performs control operation moving the second guide nip roller to the nip state until a back end of the photosensitive material passes through a position of the second guide nip roller which is located on the downstream side of the exposure position in the feeding direction.

In an eighth aspect of the present invention, the image recording apparatus further comprises a first sensor, which is provided on an upstream side of the first feeding nip roller in the feeding direction, for detecting the photosensitive material, and on the basis of detection result of the front end of the photosensitive material by the first sensor, the drive controlling section performs nip operation of the first feeding nip roller and the first guide nip roller.

In a ninth aspect of the present invention, on the basis of detection result of the back end of the photosensitive material by the first sensor, the drive controlling section performs nip release operation of the first feeding nip roller and the first guide nip roller.

In a tenth aspect of the present invention, the image recording apparatus further comprises a second sensor, which is provided between the first feeding nip roller and the first guide nip roller, for detecting the photosensitive material, and, on the basis of detection result of the front end of the photosensitive material by the second sensor, the drive controlling section performs nip operation of the second feeding nip roller and the second guide nip roller.

In an eleventh aspect of the present invention, on the basis of detection result of the back end of the photosensitive material by the second sensor, the drive controlling section performs nip release operation of the second feeding nip roller and the second guide nip roller.

DETAILED DESCRIPTION OF THE INVENTION

The image recording apparatus according to an embodiment of the present invention will be described referring to FIG. 1 to FIGS. 11A and 11B. At first the overall image recording apparatus will be described, and then the sub-scanning feeding unit which is of a main portion will be described.

(Overall Configuration of Image Recording Apparatus)

Figure 1:
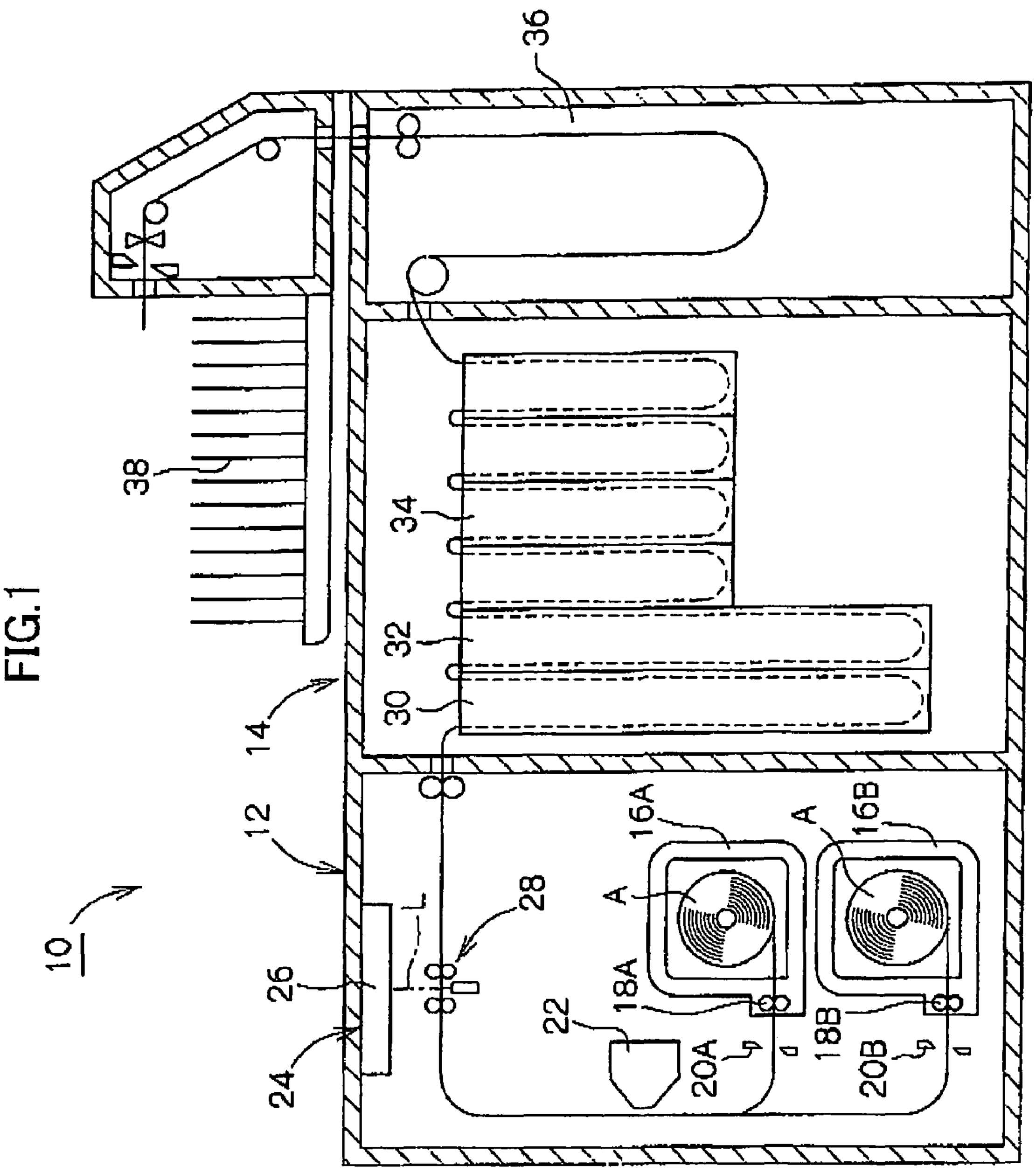
FIG. 1 is a schematic view of an image recording apparatus according to an embodiment of the present invention.

As shown in FIG. 1, an image recording apparatus 10 is mainly utilized for the image formation of the digital photo printer. The image recording apparatus 10 includes an image recording unit 12 and a processor 14. In the image recording unit 12, the scanning exposure of a photographic paper A which is of the sheet-like photosensitive material is performed with a light beam L to form the latent image according to exposure conditions determined by a setup device depending on image information read by the image reading device such as a film scanner. The processor 14 performs development of the photographic paper A in which the latent image is formed and outputs the print in which the image of the film is recorded.

Magazines 16A and 16B which store the photographic papers A wound in the roll shape is provided in the image recording unit 12. The photographic papers A are drawn from the magazines 16A and 16B by pairs of rollers 18A and 18B respectively. Then, the photographic papers A are cut into a predetermined length by cutters 20A and 20B to form the photographic paper A which is of the sheet-like photosensitive material.

A back print unit 22 is provided on the downstream side of a feeding path of the sheet-like photographic paper A. The back print unit 22 prints predetermined information on the backside of the photographic paper A. An exposure unit 24 is provided on the downstream side of the back print unit 22. The exposure unit 24 records the predetermined image on the emulsion surface of the photographic paper A.

The exposure unit 24 includes a light beam scanning device 26 and a sub-scanning feeding unit 28. The light beam scanning device 26 performs the exposure to the photographic paper A on the basis of the predetermined information, and the sub-scanning feeding unit 28 secures the planarity while accurately feeding the photographic paper A at the exposure position.

The photographic paper A in which the predetermined latent image is recorded by the exposure unit 24 is fed into the processor 14. A developing tank 30, a fixing tank 32, a water washing tank 34, and a drying unit 36 are arranged along the feeding path in the processor 14. The photographic paper A is developed as one print in such a manner that the photographic paper A sequentially passes through those tanks along the feeding path. Then, the photographic paper A is ejected to a sorter 38.

(Configuration of Sub-Scanning Feeding Unit)

The sub-scanning feeding unit 28 in the image recording unit 12 will be described below.

In the sub-scanning feeding unit 28, since the photographic paper A of the sheet-like photosensitive material is exposed to form the latent image by irradiating the photographic paper A at an exposure position P with the laser beam L outputted from the light beam scanning device 26, each pair of feeding rollers is provided at the positions located on the upstream side and the downstream side relative to the exposure position P in the feeding direction so that the photographic paper A is accurately fed onto the exposure position P.

Guide nip rollers (pressing rollers) are arranged between the pair of feeding rollers on the upstream side in the feeding direction and the exposure position P and between the pair of feeding rollers on the downstream side in the feeding direction and the exposure position P respectively, thereby the photographic paper A is prevented from rising near the exposure position A to accurately form the latent image.

Sub-scanning soft nip control is performed to each pair of rollers or each guide nip roller in the sub-scanning feeding unit 28.

In the sub-scanning feeding unit 28, uneven exposure (uneven print density) is generated by the variation of the photographic paper A or the fluctuation in feeding load of the photographic paper A. The variation and the fluctuation in feeding load are caused by the shock generated by the passage of the end portion of the photographic paper A through each pair of rollers or each guide nip roller in the nip state during the exposure operation for irradiating the photographic paper A with the laser beam to form the latent image, or the variation and the fluctuation in feeding load are caused by the shock generated by pressing each pair of rollers or each guide nip roller against the photographic paper A or by separating each pair of rollers or each guide nip roller from the photographic paper A during feeding operation for the exposure. However, the sub-scanning soft nip control can prevent the low-quality print from generating due to the uneven exposure (uneven print density).

Further, a function of special action control is added to the sub-scanning soft nip control performed in the sub-scanning feeding unit 28. The special action control avoids the generation of the error which stops the exposure operation and achieves the target action without generating loss of exposure processing time, corresponding to various irregular actions generated in the exposure operation of the photographic paper A.

Figure 2:
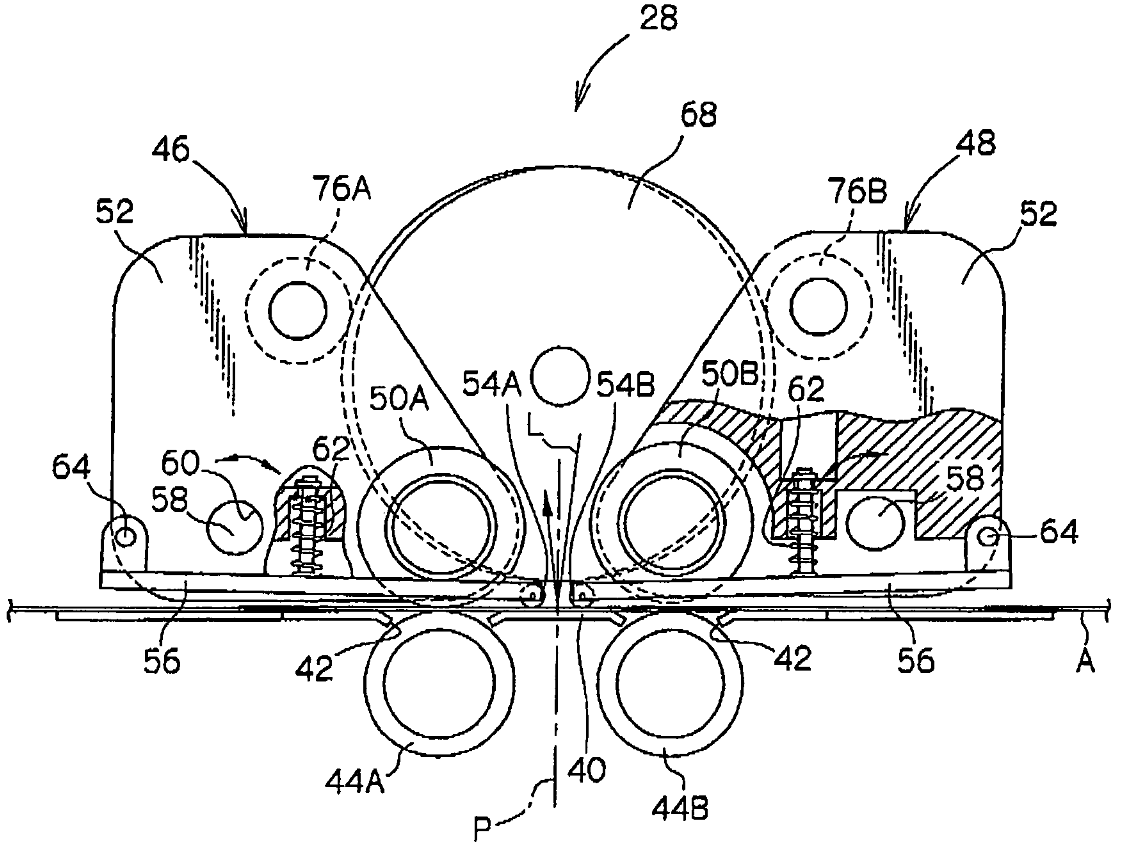
FIG. 2 is a schematic side view showing a carrying-in nip mechanism is in a nip state and a carrying-out nip mechanism is in a state starting nip release in a sub-scanning feeding unit according to the image recording apparatus of the invention.

Therefore, in the sub-scanning feeding unit 28, a flatter guide 40 is arranged along the feeding path passing through the exposure point P irradiated with the laser beam L outputted from the light beam scanning device 26 as shown in FIG. 2.

A feeding plane for feeding the photographic paper A of the sheet-like photosensitive material is formed in the flatter guide 40. Further, in the flatter guide 40, openings 42 are made at the positions on the upstream side and the downstream side which are separated by a predetermined distance from the exposure position P respectively.

Driving rollers 44A and 44B which form the pairs of feeding rollers are arranged in each opening 42 of the flatter guide 40. Each of the driving rollers 44A and 44B are arranged so that an upper end position of an outer diameter surface in each of the driving rollers 44A and 44B is flush with the feeding surface of the flatter guide 40.

In an upper portion of the flatter guide 40, a carrying-in nip mechanism 46 is arranged on the upstream side of the exposure position P in the feeding direction, and a carrying-out nip mechanism 48 is arranged on the downstream side of the exposure position P. The carrying-in nip mechanism 46 and the carrying-out nip mechanism 48 are formed to be symmetrical in relation to the exposure position P.

The carrying-in nip mechanism 46 includes a bracket 52 which journals (supports in free-rotation manner) a first feeding nip roller 50A and a support member 56 which journals a first guide nip roller 54A.

The bracket 52 is journaled (is supported in free-rotation manner) in a state in which a rotating support shaft 58 fixed to a fixing member (not shown) such as a housing of the sub-scanning feeding unit 28 is inserted in a shaft hole 60 made at the predetermined position in the bracket 52.

In the bracket 52, the first feeding nip roller 50A is configured to be able to abut on the driving roller 44A while the bracket 52 is journaled in the rotating support shaft 58. A spring member (not shown) is attached to the bracket 52. While the bracket 52 presses the first feeding nip roller 50A against the driving roller 44A, pressing force can be adjusted by means for adjusting the amount of initial elastic deformation of the spring member or the like. It is possible to utilize deadweights of the bracket 52 and the first feeding nip roller 50A for the purpose of means for pressing the first feeding nip roller 50A against the driving roller 44A.

The base end portion of the support member 56, which is formed in the shape of a long plate, is attached to the bracket 52 by a shaft pin 64 at the predetermined position in a side angle portion of the flatter guide 40. The first guide nip roller 54A is attached by the shaft at a free end portion of the support member 56, and the first guide nip roller 54A is formed so as to be able to rotate and come into contact with the photographic paper A fed on the flatter guide 40.

Figure 12:
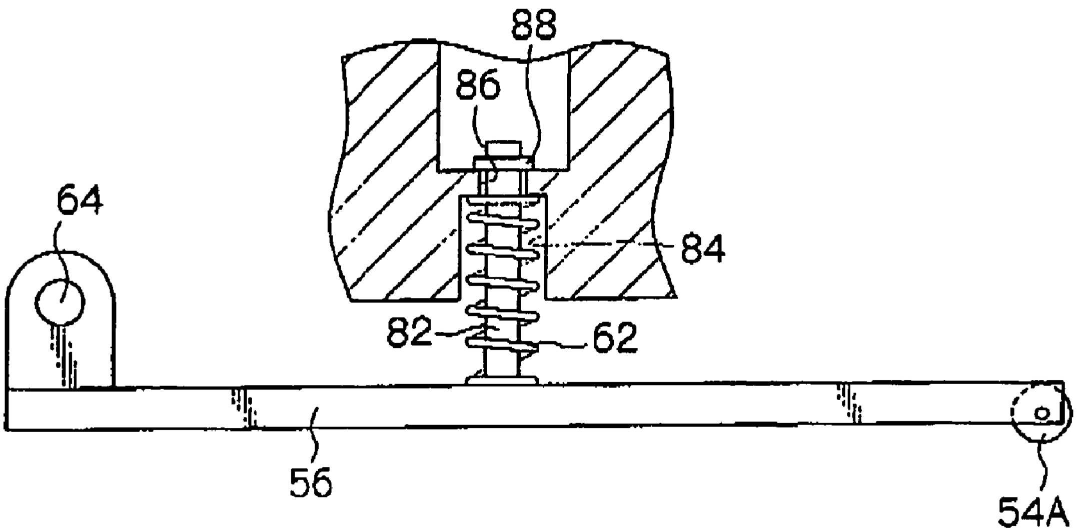
FIG. 12 is an expanded sectional view of a main part showing a stopper structure of a support member in the carrying-in nip mechanism in the sub-scanning feeding unit according to the image recording apparatus of the invention.
Figure 13:
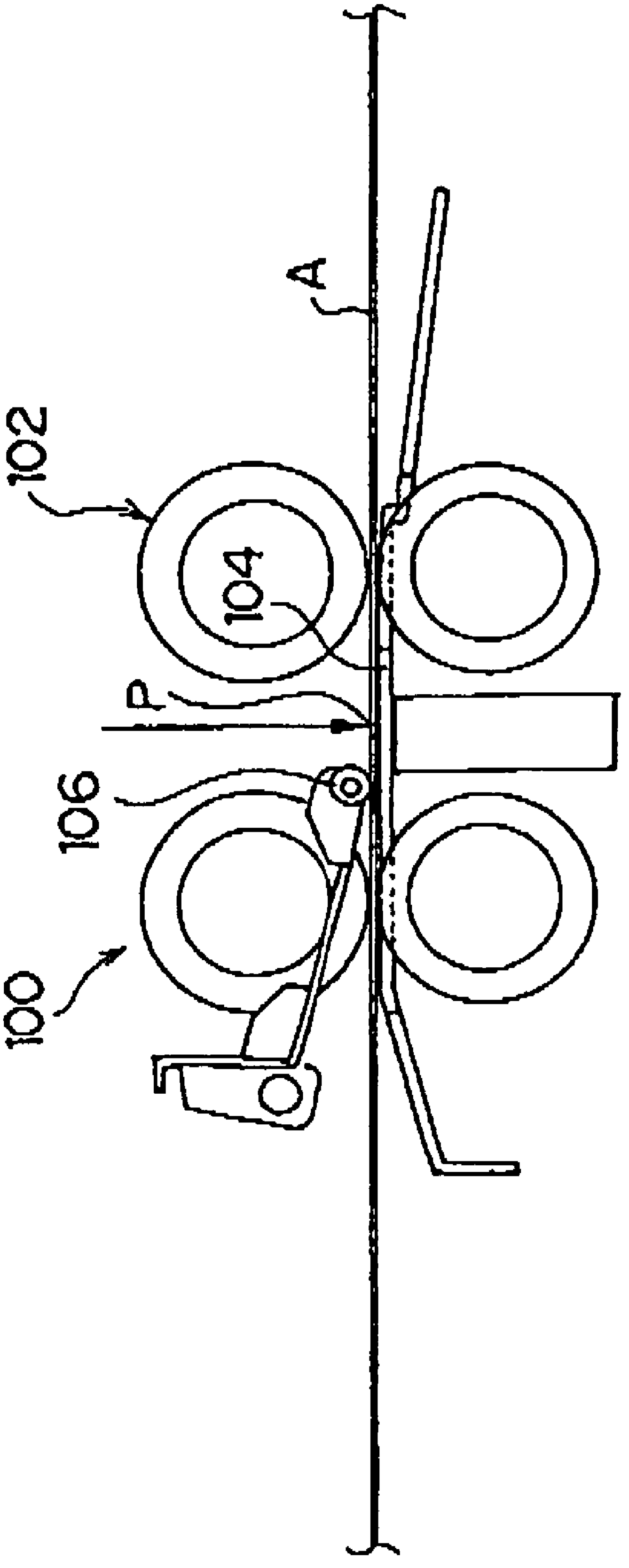
FIG. 13 is a schematic side view of the sub-scanning feeding unit of a conventional example.

As shown in FIGS. 2 and 12, a spring guide rod 82 is vertically provided at the predetermined middle position in lengthwise direction of the support member 56, and a helical (compression) spring 62 is arranged so that the spring guide rod 82 is inserted in the helical compression spring 62.

The helical compression spring 62 is freely inserted in a hole portion 84, and the hole portion 84 is made at the predetermined position in a bottom portion of the bracket 52 to which the free end portion of the spring guide rod 82 faces.

A through hole 86 is made in the center of the bottom surface of the hole portion 84 so that the free end portion of the spring guide rod 82 slidably passes through the through hole 86. Then, a stopper structure which prevents the spring guide rod 82 from falling off from the through hole 86 is provided by fitting a stopper 88 in the predetermined position of front end portion of the spring guide rod 82 penetrating the through hole 86.

According to the above structure, the helical compression spring 62 is provided between the bottom surface of the hole portion 84 and the upper surface of the spring guide rod 82, the support member 56 is biased while rotated about the axial pin 64 so that the first guide nip roller 54A at the end of the support member 56 is rotated in the direction in which the first guide nip roller 54A is pressed against the flatter guide 40. Therefore, the first guide nip roller 54A is pressed against the photographic paper A on the flatter guide 40 with predetermined pressing force, and the photographic paper A can be prevented from rising.

At this point, when the first guide nip roller 54A at the end of the support member 56 is rotated by the predetermined amount of rotation (a predetermined moving distance of the first guide nip roller 54A relative to the bracket 52) in the direction in which the first guide nip roller 54A is pressed against the flatter guide 40, the stopper 88 in the stopper structure abuts on a periphery of the hole portion 84 to restrain the rotation of the support member 56.

That is to say, the support member 56 is attached so that the moving distance of the first guide nip roller 54A relative to the bracket 52 becomes constant by the stopper structure having the stopper 88 provided in the spring guide rod 82 inserted into the through hole 86.

It is also possible that the stopper 88 provided in the spring guide member 82 is movably and adjustably formed into a nut having means for turning and stopping a screw which is screwed in a screw hole made in the end portion of the spring guide rod 82. Further, it is also possible that the spring guide member 82 is formed into the substantially C-shaped member fitted within a circular groove made in the spring guide rod 82 while the spring guide member 82 is not movable and not adjustable.

As shown in FIG. 2, the carrying-out nip mechanism 48 arranged on the downstream side of the exposure position P in the feeding direction is similar to the above carrying-in nip mechanism 46 in the structure, the bracket 52 which journals the second feeding nip roller 50B is journaled in the other rotating support shaft 58, the support member 56 in which the second guide nip roller 54B is attached to the shaft of support member 56 is attached to the bracket 52, and the stopper structure and other structures are also formed in a manner similar to the carrying-in nip mechanism 46.

The carrying-in nip mechanism 46 and the carrying-out nip mechanism 48 are controlled so as to work with a first cam 68 and a second cam 70 which are integrally formed. The rotation of the first cam 68 and the second cam 70 is simultaneously controlled by driving and controlling means including a single pulse motor 66 controlled by a control unit 67.

Figure 4:
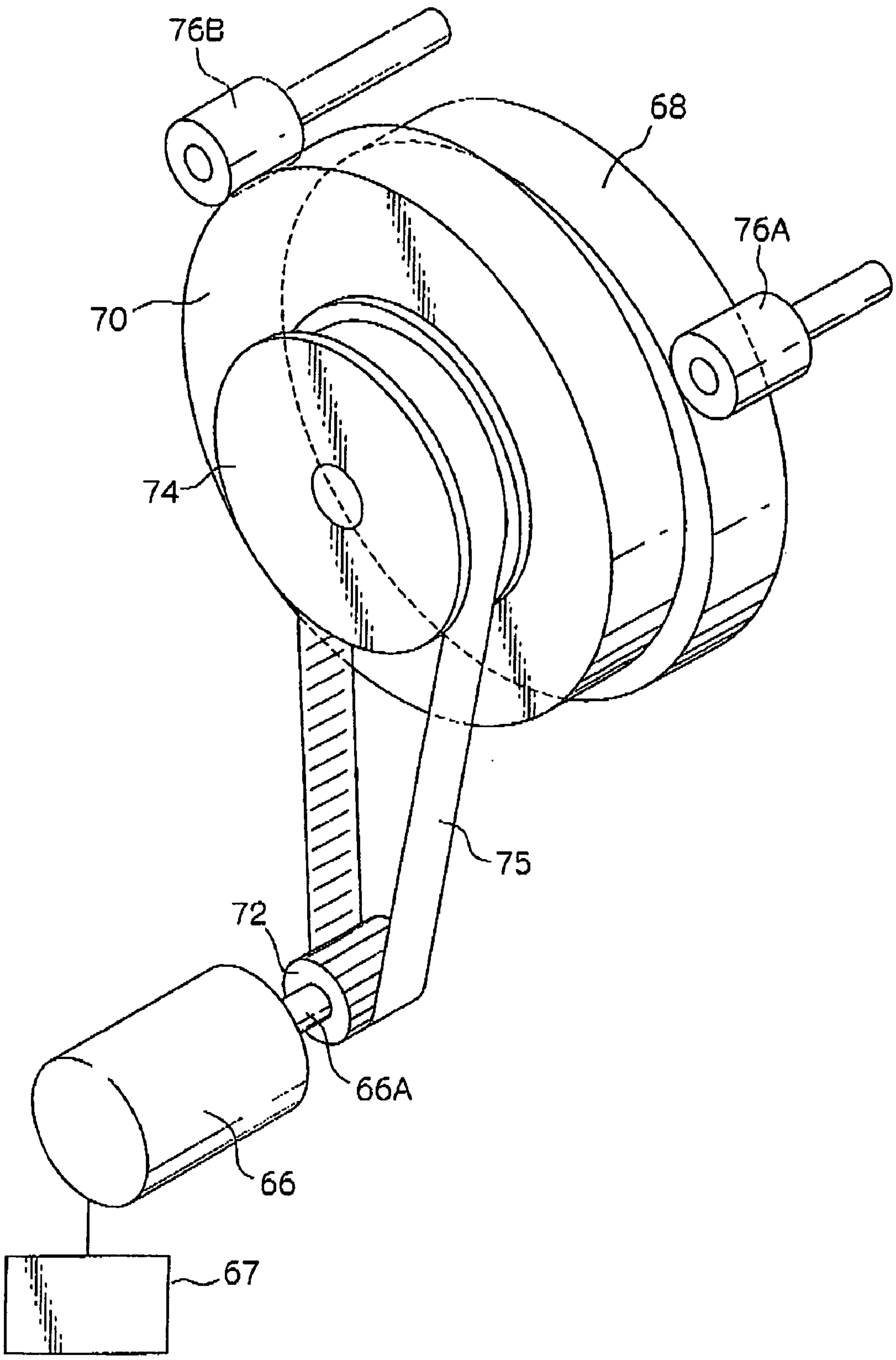
FIG. 4 is a schematic perspective view of a main part showing a drive controlling section for controlling each roller while the drive controlling section is extracted in the sub-scanning feeding unit according to the image recording apparatus of the invention.
Figure 5A:
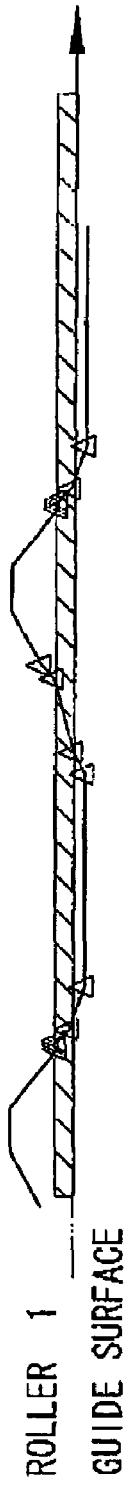
FIGS. 5A to 5D are a timing chart showing action timing of each roller in the sub-scanning feeding unit according to the image recording apparatus of the invention.
Figure 5B:
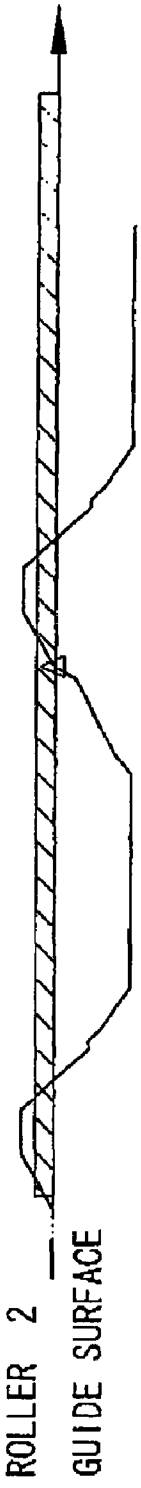
Figure 5C:
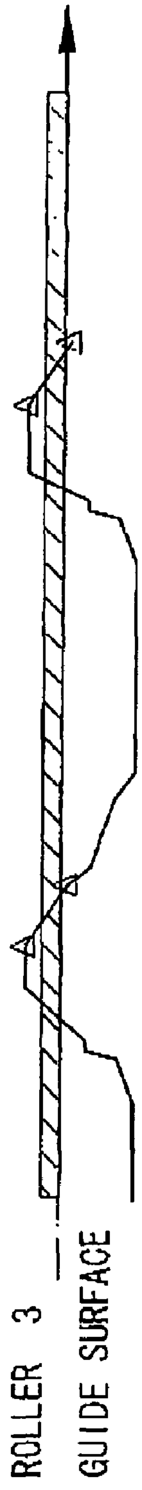
Figure 5D:
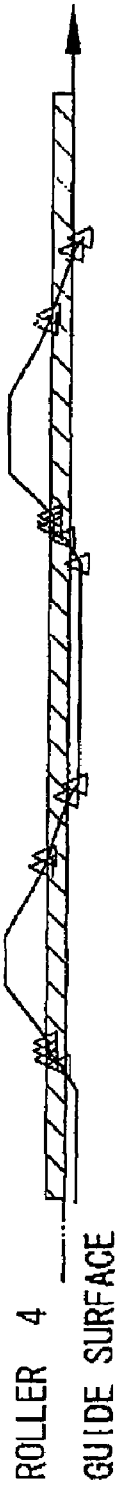

As shown in FIG. 4, in the driving and controlling means, the rotation of the first cam 68 and the second cam 70 are simultaneously controlled by the pulse motor 66 through a belt transmission mechanism. The belt transmission mechanism is formed to wind a belt 75 having high rigidity between a pulley 72 which is provided in an output shaft 66A of the pulse motor 66 and a pulley 74 which is coaxially integrated with the first cam 68 and the second cam 70.

Each cam surface is formed on the outer peripheral surface of the first cam 68 and the second cam 70 respectively.

As shown in FIGS. 2 and 4, cam followers 76A and 76B are attached to the bracket 52 of the carrying-in nip mechanism 46 and the bracket 52 of the carrying-out nip mechanism 48 respectively. The cam followers 76A and 76B are the roller which is attached as a follower of the cam mechanism while the roller is freely rotated.

The carrying-in nip mechanism 46 performs predetermined rotational action about the rotational support shaft 58 along a cam curve of the first cam 68 by rotating the cam follower 76A attached to the shaft of the bracket 52 while the cam follower 76A is in contact with the cam surface of the first cam 68.

The carrying-out nip mechanism 48 performs predetermined rotational action about the rotational support shaft 58 along a cam curve of the second cam 70 by rotating the cam follower 76B attached to the shaft of the bracket 52 while the cam follower 76B is in contact with the cam surface of the second cam 70.

In the driving and controlling means, since the single pulse motor 66 simultaneously rotates the first cam 68 and the second cam 70 integrated with the first cam 68, the action always having a constant correspondence of the carrying-in nip mechanism 46 to the carrying-out nip mechanism 48 is performed.

In the driving and controlling means, the structure is simplified by forming the first cam 68 and the second cam 70 into the integral cam to drive the integral cam with the single pulse motor 66, so that the driving and controlling means can be manufactured at low cost.

The control unit 67 in the driving and controlling means is configured to be a programmable computer system. The programmable computer system controls the exposure of the light beam scanning device 26 while performing sub-scanning soft nip control which controls the pulse motor 66 and the like on the basis of operation direction inputted to the image recording apparatus 10, detection information of an exposure entrance sensor 78 and an immediately before exposure position sensor 80, or the like.

The sub-scanning soft nip control performed in the sub-scanning feeding unit 28 will be described below referring to FIGS. 5A to 5D and FIGS. 6A to 6D.

As shown in FIGS. 6A to 6D, in order to perform the sub-scanning soft nip control, in the sub-scanning feeding unit 28, the exposure entrance sensor 78 is arranged at an upstream side entrance detection position which is located a predetermined distance on the upstream side from the first feeding nip roller 50A on the feeding path, and the immediately before exposure position sensor 80 is arranged at an immediately before exposure detection position which is located a predetermined short distance on the upstream side in the feeding direction from the exposure position P.

The exposure entrance sensor 78 and the immediately before exposure position sensor 80 are formed by combining a light-emission element and a light-receiving element respectively. The passage of the front end of the photographic paper A which is of the sheet-like photosensitive material can be detected by migration from a light-receiving state to a light-shielding state, and the passage of the back end of the photographic paper A can be detected by the migration from a light-shielding state to a light-receiving state.

Figure 6A:
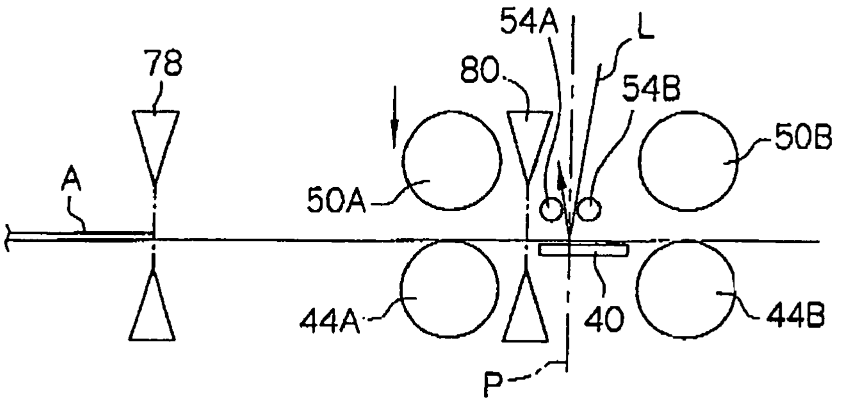
FIGS. 6A to 6D are an explanatory view showing a control action state of each roller in the sub-scanning feeding-unit according to the image recording apparatus of the invention.

In the sub-scanning soft nip control performed by the sub-scanning feeding unit 28 having the above structure, as shown in FIG. 6A, both the carrying-in nip mechanism 46 and the carrying-out nip mechanism 48 are in a nip released state at an initial state (default state of a non-use state in which the scanning exposure is not performed).

Figure 3:
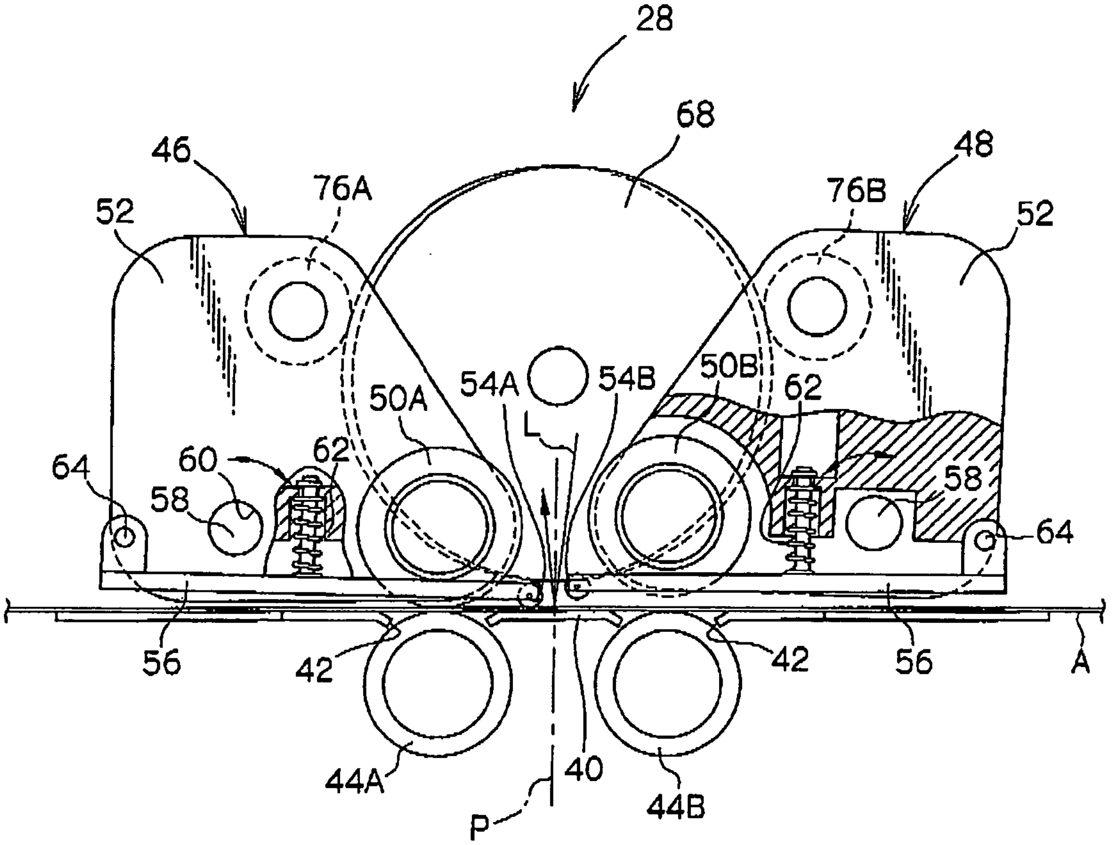
FIG. 3 is a schematic side view showing the carrying-in nip mechanism is in the nip state and the carrying-out nip mechanism is in a nip released state in the sub-scanning feeding unit according to the image recording apparatus of the invention.

In the carrying-in nip mechanism 46 and the carrying-out nip mechanism 48, basically the first and second feeding nip rollers 50A and 50B are separated by the predetermined distance from the driving rollers 44A and 44B respectively, and the first and second guide nip rollers 54A and 54B are separated by the predetermined distance from the flatter guide 40 (for example, the nip released state of the carrying-out nip mechanism 48 shown in FIG. 3). Therefore, in the default state of the non-use state in which the scanning exposure is not performed, since the carrying-in nip mechanism 46 and the carrying-out nip mechanism 48 becomes the nip released state in which the first and second feeding nip rollers 50A and 50B are separated by the predetermined distance from the driving rollers 44A and 44B respectively, the first and second feeding nip rollers 50A and 50B and the driving rollers 44A and 44B are prevented the generation of deformation which is caused by leaving those rollers in the pressed state (nip state) for a long time.

Together with this, each the first and second guide nip rollers 54A and 54B are separated by the predetermined distance from the flatter guide 40 and in which becomes the nip released state, prevented the generation of deformation which is caused by leaving those rollers in the pressed state (nip state) for a long time.

Figure 7:
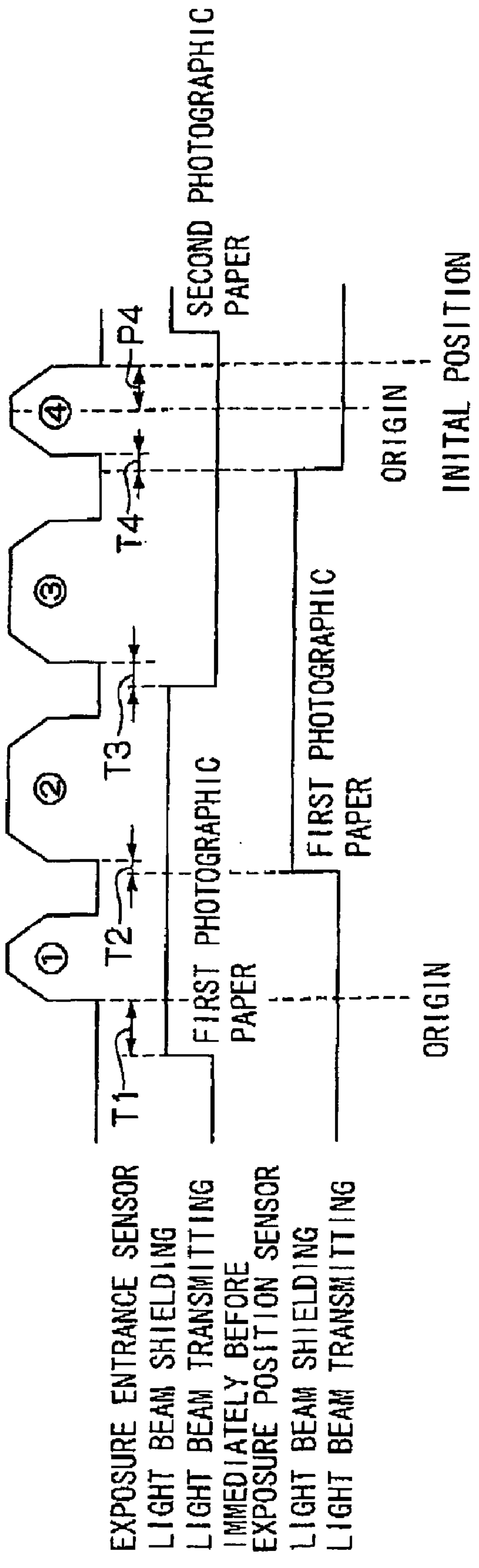
FIG. 7 is a timing chart showing control of basic action in the drive controlling section for controlling each roller of the sub-scanning feeding unit according to the image recording apparatus of the invention.

Then, in the sub-scanning soft nip control, when the exposure entrance sensor 78 detects the front end of the photographic paper A fed on the feeding path, nip set action of the carrying-in nip mechanism 46 is performed after a waiting period until a predetermined time T1 elapses as shown in FIG. 7, the first feeding nip roller 50A comes into contact with the driving roller 44A while the first feeding nip roller 50A is rotated, and the first guide nip roller 54A is moved to come into contact with the flatter guide 40 while the first guide nip roller 54A is rotated (for example, the nip state of the carrying-in nip mechanism 46 shown in FIG. 2), and waits the entry of the front end of the photographic paper A.

The action is controlled so that the nip action of the first guide nip roller 54A is finished before the front end of the photographic paper A passes through (arrives at) the position of the first feeding nip roller 50A. When the action is performed in a meaner described above, the photographic paper A is nipped by the first guide nip roller 54A. Further, even if the action in which the first feeding nip roller 50A comes into contact with the photographic paper A to nip the photographic paper A is performed during the state while the photographic paper A is irradiated with the laser beam L to perform the exposure, the unevenness caused by the vertical vibration or the unevenness caused by bounding can be prevented.

Then, the front end of the photographic paper A enters between the first feeding nip roller 50A and the driving roller 44A to be nipped. When the front end of the photographic paper A is fed to be detected by the immediately before exposure position sensor 80, the nip set action of the carrying-out nip mechanism 48 is performed after the waiting period until a predetermined time T2 elapses as shown in FIG. 7.

Figure 6B:
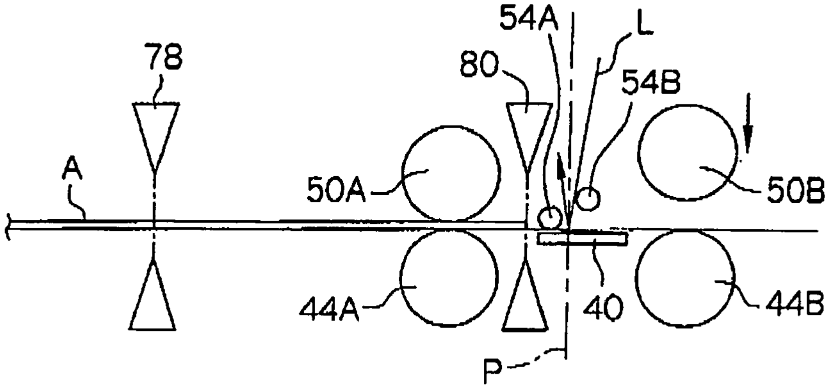
Figure 6C:
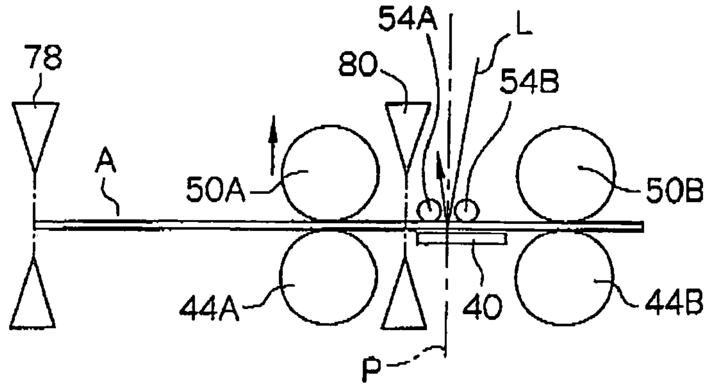

In the nip set action of the carrying-out nip mechanism 48, as shown in FIG. 6B, the front end of the photographic paper A moves from the position of the immediately before exposure position sensor 80 into the first guide nip roller 54A which abuts on the flatter guide 40, and then the front end of the photographic paper A is fed through the exposure position P. After the front end of the photographic paper A passes through the position of the second guide nip roller 54B, which is separated from the flatter guide 40, by a predetermined length without coming into contact with the second guide nip roller 54B, the second guide nip roller 54B comes into contact with the photographic paper A in the exposure on the flatter guide 40 while the second guide nip roller 54B is rotated, and the photographic paper A is moved in the nip state in which the guidance is performed so that the photographic paper A is prevented from rising as shown in FIG. 6C.

In the nip set action of the carrying-out nip mechanism 48, after the front end of the photographic paper A further proceeds and passes through the position of the second feeding nip roller 50B, which is separated from the driving rollers 44B, by the predetermined length without coming into contact with the second guide nip roller 54B, the nip set action migrates to the state in which the photographic paper A is sandwiched between the second feeding nip roller 50B and the driving roller 44B.

After the predetermined time elapsed with reference to timing when the front end of the photographic paper A is detected by the immediately before exposure position sensor 80, the latent image is two-dimensionally recorded onto the photographic paper A which has reached the exposure position P by the scanning of the laser beam L incident from the light beam scanning device 26.

Since the carrying-out nip mechanism 48 has the structure in which the support member 56 is operated while working with the bracket 52, in the case where the carrying-out nip mechanism 48 is moved into the nip state, the second guide nip roller 54B firstly nips the driving roller 44B, and then the second feeding nip roller 50B nips the driving roller 44B.

That is to say, the carrying-in nip mechanism 46 and the carrying-out nip mechanism 48 are operated so as to become the nip released state (for example, the carrying-out nip mechanism 48 in the state shown in FIG. 3) from the nip state (for example, the carrying-out nip mechanism 48 in the state shown in FIG. 2) through the transition state of the moving action (for example, the carrying-in nip mechanism 46 in the state during the moving action shown in FIG. 2), or the carrying-in nip mechanism 46 and the carrying-out nip mechanism 48 are operated in a reverse,manner.

In the carrying-out nip mechanism 48, when the second guide nip roller 54B is controlled so as to come into contact with the photographic paper A to become the nip state in which the photographic paper A is pressed with predetermined pressure after the front end of the photographic paper A passes through the position of the second guide nip roller 54B in the nip released state, even if the photographic paper A is curled, an interval between the flatter guide 40 and the second guide nip roller 54B is controlled so as to be separated by the distance of the extent that the front end of the photographic paper A does not collide with the second guide nip roller 54B to generate the shock or the vibration (interval more than the amount of curl of the photosensitive material).

In the control in which the carrying-out nip mechanism 48 is moved to the nip state, when the second guide nip roller 54B comes into contact with the photographic paper A fed on the flatter guide 40 to press the photographic paper A, the second guide nip roller 54B is controlled so that descent speed becomes predetermined slow speed. In this case, even if the surface of the photographic paper A is moved to the flatter guide 40 side to generate the uneven exposure by shifting an address (position) irradiated with the laser beam L of the light beam scanning device 26 as the second guide nip roller 54B presses the photographic paper A, the uneven exposure caused by the address shift can be suppressed within the permissible range of user's observation (within the visibility permissible range).

Similarly, in the control in which the carrying-out nip mechanism 48 is moved to the nip state, when the photographic paper A is controlled so as to be nipped between the second feeding nip roller 50B and the driving roller 44B after the front end of the photographic paper A passes through the position of the second guide nip roller 54B in the nip released state, even if the photographic paper A is curled, the interval between the second feeding nip roller 50B and the driving roller 44B is controlled so as to be separated by the distance of the extent that the front end of the photographic paper A does not collide with the second feeding nip roller 50B to generate the shock or the vibration (interval more than the amount of curl of the photosensitive material).

Further, in the control in which the carrying-out nip mechanism 48 is moved to the nip state, when the second feeding nip roller 50B comes into contact with the photographic paper A fed on the flatter guide 40 to press the photographic paper A, the second feeding nip roller 50B is controlled so that the descent speed becomes the predetermined slow speed. In this case, even if the uneven exposure is generated by the propagation of the position shift, the shock, and the vibration generated when the second feeding nip roller 50B nips the photographic paper A, the uneven exposure can be suppressed within the permissible range of user's observation (within the visibility permissible range).

When the first feeding nip roller 50A and the second feeding nip roller 50B come into contact with the photographic paper A respectively, it is preferable that the descend speed is not more than 3.0 mm/s. This allows the shock of the contact to be released. Since the first feeding nip roller 50A and the second feeding nip roller 50B largely influence the driving system for the photographic paper A, it is necessary to decrease contact speed, and it is preferable that the decrease in the contact speed ranges from −0.05 mm to −0.45 mm relative to the contact surface. In the range except the range of the decrease in the contact speed, experiments in which the actual apparatus is operated shows that the moving speed of the first feeding nip roller 50A and the second feeding nip roller 50B is preferably increased as much as possible to correspond to the high-speed exposure feeding.

In the exposure operation in which the photographic paper A is irradiated with the laser beam L from the light beam scanning device 26 to form the latent image, when the first guide nip roller 54A and the second guide nip roller 54B come into contact with the photographic paper A or are separated from the photographic paper A, the ascent/descent speed of the first guide nip roller 54A and the second guide nip roller 54B is set to 6.5 mm/s, which enables the uneven exposure caused by the address shift in pressing the photographic paper A with the rollers to be suppressed within the visibility permissible range (within the range in which users do not worry about the unevenness in the image on the photographic paper A when users observe the image).

The maximum value of ascent/descent speed W(max) which can suppress the unevenness within the visibility permissible range can be determined from an equation $W(max)=V\times 0.004/\tan\theta$, where θ is an exposure angle, and V is exposure feeding linear speed. That is to say, with respect to an exposure angle: θ (in this case, θ=4°), the maximum value of the ascent/descent speed W(max) (the maximum amount of shift of the paper address (speed)) in order to make exposure feeding linear speed V to the range within 0.4% (±0.25), can be obtained from the above equation. Accordingly, the ascent/descent speed which can suppress within the permissible range of visibility (within the range in which users do not worry about the unevenness in the image on the photographic paper A when users observe the image) is set to equal to or less than the maximum value of ascent/descent speed W(max). The lowest value of ascent/descent speed w(mini) is determined on the basis of constraint based on designing of the image recording apparatus 10. In practice, because a required operation time Z is determined on the basis of a minimum length of paper and the exposure feeding linear speed, a speed, which the first guide nip roller 54A and the second guide nip roller 54B move in a distance of a nip release height H, in which the first guide nip roller 54A and the second guide nip roller 54B are away from the flatter guide 40, within the required operation time Z, is the lowest value W(mini) of ascent/ descent speed W, W(mini)=H/Z. Further, in the image recording apparatus 10, in a case in which the ascent/descent speed is set to the maximum value W(max) of the ascent/descent speed, the unevenness can be suppressed within the visibility permissible range. Therefor, if the ascent/descent speed is set to a speed value which is between the maximum value W(max) of the ascent/descent speed and the lowest value of ascent/descent speed W(mini) which is less than the maximum value W(max), the unevenness caused by the address shift in pressing the photographic paper A with the rollers can be made smaller, and the unevenness can be suppressed sufficiently within the visibility permissible range.

In the sub-scanning soft nip control, when each of the front end and the backend of the photographic paper A in exposure passes through each position of the first feeding nip roller 50A and the second feeding nip roller 50B or each position the first guide nip roller 54A and the second guide nip roller 54B, the operation is controlled so that clearance (interval) is not lower than 0.5 mm between the driving rollers 44A and 44B and the corresponding first and second feeding nip rollers 50A and 50B or between the flatter guide 40 and the first and second guide nip rollers 54A and 54B. Therefore, even if the photographic paper A is curled in exposure, the provision of the interval (interval more than the amount of curl of the photosensitive material) which the front end and the backend of the photographic paper A pass through without contact can prevent the unevenness caused by the vertical vibration or bounding, which is generated by the contact of the photographic paper A with the first and second feeding nip rollers 50A and 50B or the first and second guide nip rollers 54A and 54B.

According to tests of the actual apparatus, when the interval which the front end and the backend of the photographic paper A pass through without contact is more than 0.5 mm, the interval has the clearance more than the amount of curl of the paper, and the contact of the photographic paper A can be prevented.

Figure 6D:
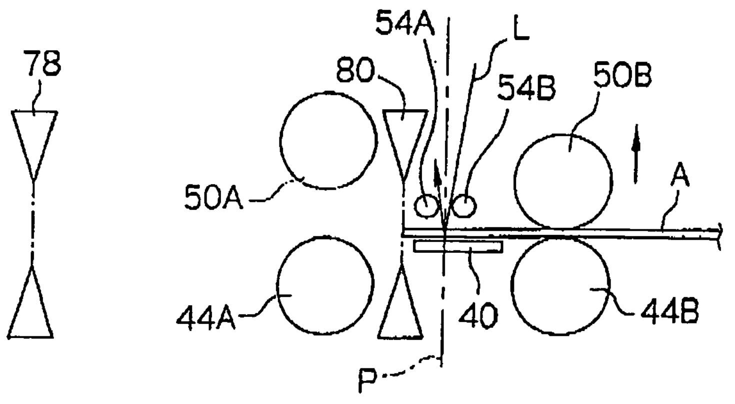

In the sub-scanning soft nip control, from the state shown in FIG. 6B through the state shown in FIG. 6D, the photographic paper A which is sub-scanned at the exposure position P on the flatter guide 40 is irradiated with the laser beam L from the light beam scanning apparatus 26 to form the latent image on the photographic paper A.

In the sub-scanning soft nip control, when the back end of the photographic paper A in exposure fed on the feeding path by the sub-scanning is detected by the exposure entrance sensor 78, the nip releasing action of the carrying-in nip mechanism 46 is performed after the waiting period until a predetermined time T3 elapses as shown in FIG. 7. Thereby, the sub-scanning soft nip control migrates to the state shown in FIG. 6D, in which the first guide nip rollers 54A is separated from the flatter guide 40 and the first feeding nip roller 50A is separated from the driving roller 44A, and waits the passage of the backend of the photographic paper A through the first guide nip rollers 54A and the first feeding nip roller 50A.

That is to say, in the nip releasing action of the carrying-in nip mechanism 46, while the first feeding nip roller 50A is separated from the driving roller 44A before the backend of the photographic paper A in exposure passes through the position of the first feeding nip roller 50A, the first guide nip roller 54A is separated from the photographic paper A in exposure on the flatter guide 40 before the backend of the photographic paper A passes through the position of the first guide nip roller 54A.

Therefore, during the exposure processing with the laser beam L from the light beam scanning while the sub-scanning of the photographic paper A is performed, the backend of the photographic paper A passes through the position of the first feeding nip roller 50A which is separated from the driving roller 44A without coming into contact with the first feeding nip roller 50A, the photographic paper A is fed, and then the backend of the photographic paper A passes through the position of the first guide nip roller 54A which is separated from the flatter guide 40 without coming into contact with the first guide nip roller 54A.

The shock and the vibration are generated, when the backend of the photographic paper A in exposure passes through between the first feeding nip roller 50A and the driving roller 44A which are in the nip state or between the first guide nip roller 54A and the flatter guide 44A which are in the nip state. The uneven exposure is generated by the propagation of the shock and the vibration to the photographic paper A in exposure at the exposure position P. However, in the case of the above control, the generation of the uneven exposure can be prevented.

Since the carrying-in nip mechanism 46 has the structure in which the support member 56 is operated while working with the bracket 52, in the case where the carrying-in nip mechanism 46 is moved into the nip released state, the first guide nip roller 54A is firstly separated from the flatter guide 40, and then the first feeding nip roller 50A is separated from the driving roller 44A.

In the control in which the carrying-in nip mechanism 46 is moved to the nip released state, as shown in FIG. 6D, when the back end of the photographic paper A in exposure is controlled so as to pass through the position of the first feeding nip roller 50A, even if the photographic paper A in exposure is curled, the interval between the first feeding nip roller 50A and the driving roller 44A is controlled so as to be separated by the distance of the extent that the front end of the photographic paper A does not collide with the first feeding nip roller 50A to generate the shock or the vibration (interval more than the amount of curl of the photosensitive material).

In the control in which the carrying-in nip mechanism 46 is moved to the nip released state, when the first feeding nip roller 50A is separated from the photographic paper A fed on the driving roller 44A, the first feeding nip roller 50A is controlled so that descent speed becomes the predetermined slow speed. A fluctuation in feeding load is generated when the first feeding nip roller 50A is separated from the photographic paper A in exposure. The uneven exposure is generated by the propagation of the fluctuation in feeding load to the photographic paper A at the exposure position P. However, according to the above control, the uneven exposure can be suppressed.

In the control in which the carrying-out nip mechanism 48 is moved to the nip released state, when the first guide nip roller 54A is separated from the photographic paper A fed on the flatter guide 40, the first guide nip roller 54A is controlled so that the ascent speed becomes the predetermined slow speed. In this case, even if the surface of the photographic paper A is moved so as to rise from the surface of the flatter guide 40 to generate the uneven exposure by shifting the address (position) irradiated with the laser beam L of the light beam scanning device 26 as the pressure applied to the photographic paper A by the first guide nip roller 54A is released, the uneven exposure caused by the address shift can be suppressed within the permissible range of the user's observation (within the visibility permissible range).

In the control in which the carrying-in nip mechanism 46 is moved to the nip state, when the back end of the photographic paper A is controlled so as to pass through the position of the first guide nip roller 54A which is in the nip released state, even if the photographic paper A in exposure is curled, the interval between the first guide nip roller 54A and the flatter guide 40 is controlled so as to be separated by the distance of the extent that the back end of the photographic paper A does not collide with the first feeding nip roller 54A to generate the shock or the vibration (interval more than the amount of curl of the photosensitive material).

In the sub-scanning soft nip control, when the back end of the photographic paper A in exposure fed on the feeding path by the sub-scanning is detected by the immediately before exposure position sensor 80, the nip releasing action of the carrying-out nip mechanism 48 is performed after the waiting period until a predetermined time T4 elapses as shown in FIG. 7. Thereby, the sub-scanning soft nip control migrates to the state, in which the second feeding nip rollers 50B is separated from the driving roller 44B and the second guide nip roller 54B is separated from the flatter guide 40, and passes the backend of the photographic paper.

In the sub-scanning soft nip control, the nip action of the second guide nip roller 54B is maintained until the back end of the photographic paper A in exposure passes through the position of the second guide nip roller 54B, thereby the action is controlled so that the photographic paper A is prevented from rising. According to the above control, even if the second feeding nip roller 50B is separated from the photographic paper A in the exposure state in which the photographic paper A is irradiated with the laser beam L, the photographic paper A is nipped by the second guide nip roller 54B, so that generation of the vertical vibration or the generation of the unevenness due to the bounding can be prevented.

Then, after the predetermined time elapsed with reference to timing when the back end of the photographic paper A is detected by the immediately before exposure position sensor 80, the photographic paper A leaves the exposure position, and the emission of the laser beam L outputted from the light beam scanning device 26 is stopped to finish the exposure processing.

In the sub-scanning soft nip control, when means for detecting an origin (not shown) provided in the pulse motor 66 detects the origin during the control of the nip releasing action of the carrying-out nip mechanism 48, the first and second feeding nip rollers 50A and 50B and the first and second guide nip rollers 54A and 54B are returned to the initial standby state shown in FIG. 6A (the first and second feeding nip rollers 50A and 50B and the first and second guide nip rollers 54A and 54B are returned to the initial position by the action similar to the initialized state). Therefore, in the sub-scanning soft nip control, initialization action in which the pulse motor 66 is driven from the origin by a predetermined number of initialization pulses P4 shown in FIG. 7 to stop at the initial position is performed, and a series of control actions to the photographic paper A is finished. When the next photographic paper A is fed to the sub-scanning feeding unit 28, the above series of control actions is repeated.

Specific examples of the control actions to each of the first feeding nip roller 50A (roller 1), the first guide nip roller 54A (roller 2), the second feeding nip roller 50B (roller 3), and the second guide nip roller 54B (roller 4) will be described referring to FIGS. 5A to 5D. In the sub-scanning feeding unit 28 controlled by the sub-scanning soft nip control, the control actions to the first feeding nip roller 50A (roller 1), the first guide nip roller 54A (roller 2), the second feeding nip roller 50B (roller 3), and the second guide nip roller. 54B (roller 4) are performed in such a manner that the control unit 67 controls the drive of the pulse motor 66 by rotating the first cam 68 and the second cam 70.

In the sub-scanning soft nip control whose main point are shown in FIGS. 5A to 5D, the basic action and the special action are performed. The basic action includes the control in which the pulse motor 66 is driven at predetermined low speed (not more than 3.0 mm/s) in order to suppress the generation of the uneven exposure caused by the fluctuation in feeding load in the case where the each roller presses the photographic paper A or is separated from the photographic paper A, the control in which the pulse motor 66 is driven at predetermined high speed (not more than 6.5 mm/s) in order to increase in processing speed by driving the pulse motor 66 faster than the predetermined low speed, and the control in which the pulse motor 66 is stopped at predetermined timing for a predetermined period. The special action changes and adjusts each changing timing among the control in which the pulse motor 66 is driven at predetermined low speed, the control in which the pulse motor 66 is driven at predetermined high speed, and the control in which the pulse motor 66 is stopped for a predetermined period.

In FIGS. 5A to 5D, the region where the pulse motor 66 is driven at predetermined low speed is expressed as the low-speed region located at the upper position of the guide surface (the strip-shaped hatched region shown in FIGS. 5A to 5D).

With reference to the basic actions of the first feeding nip roller 50A (roller 1) and the first guide nip roller 54A (roller 2), the first feeding nip roller 50A (roller 1) is on standby at the position far from the driving roller 44A in the initial standby state (similar to the initialized state). At this point, the amount of release of standby state which is of the distance between the first feeding nip roller 50A (roller 1) and the driving roller 44A is set to 0.4±0.2 mm.

When the nip set action is started, the first feeding nip roller 50A (roller 1) initially moves at high speed (not more than 6.5 mm/s). When the first feeding nip roller 50A (roller 1) enters the low-speed region, the first feeding nip roller 50A (roller 1) is changed to the low speed (not more than 3.0 mm) to move at low speed. The first feeding nip roller 50A becomes the nip state in which the first feeding nip roller 50A (roller 1) comes into contact with the driving roller 44A before the front end of the photographic paper A enters a roller nip point of the first feeding nip roller 50A (roller 1), and then the first feeding nip roller 50A becomes the complete nip state in which the first feeding nip roller 50A (roller 1) is in contact with the driving roller 44A while pressing the driving roller 44A with predetermined pressure before the front end of the photographic paper A enters a detection point of immediately before exposure position sensor 80. Then first feeding nip roller 50A (roller 1) is stopped.

The first guide nip roller 54A (roller 2) finishes the nip action while working with the first feeding nip roller 50A (roller 1) so that the first guide nip roller 54A (roller 2) precedes the action of the first feeding nip roller 50A (roller 1).

After the first feeding nip roller 50A (roller 1) and the first guide nip roller 54A (roller 2) are controlled to stop in the nip state, the first feeding nip roller 5A (roller 1) and the first guide nip roller 54A (roller 2) migrate to the control of the nip releasing action.

In the control of the nip releasing action, the action of the first feeding nip roller 50A (roller 1) precedes the action of the first guide nip roller 54A (roller 2). Therefore, the first feeding nip roller 50A (roller 1) moves at low speed (not more than 3.0 mm/s) until the first feeding nip roller 50A (roller 1) passes through the low-speed region. After the first feeding nip roller 50A (roller 1) moves to the position where the distance between the first feeding nip roller 50A (roller 1) and the driving roller 44A is not lower than 0.5 mm, the first feeding nip roller 50A (roller 1) passes the back end of the photographic paper A.

In the control of the nip releasing action, when the back end of the photographic paper A passes through the position of the first feeding nip roller 50A (roller 1) which is in nip released state, the first guide nip roller 54A (roller 2) slightly nips the back end of the photographic paper A.

In the control of the nip releasing action, after the back end of the photographic paper A passes through the position of the first feeding nip roller 50A (roller 1), the first feeding nip roller 50A (roller 1) is changed to the high speed and moves to become the nip released state. Until the back end of the photographic paper A reaches the position of the first guide nip roller 54A (roller 2), the first guide nip roller 54A (roller 2) is controlled so that the distance between the first guide nip roller 54A (roller 2) and the flatter guide 40 is more than 0.7±0.2 mm.

In the above manner, the control to the first photographic paper A is completed, and the rollers return to the initial standby state (similar to the initialized state).

In the case where the second photographic paper A is fed after a predetermined time interval, the above control actions are repeated. In this case, at the time when first feeding nip roller 50A (roller 1) is in the nip released state immediately before nipping the driving roller 44A, the later-mentioned second feeding nip roller 50B (roller 4) is controlled so as to be in the nip released state to the first photographic paper A.

In the control of the basic actions of the second guide nip roller 54B (roller 3) and the second feeding nip roller 50B (roller 4), when the nip releasing action to the first photographic paper A is performed, the second guide nip roller 54B (roller 3) and the second feeding nip roller 50B (roller 4) are controlled so as to hold the state in which the second guide nip roller 54B (roller 3) and the second feeding nip roller 50A (roller 4) slightly nip the photographic paper A until the back end of the photographic paper A passes through the nip point, and then the second guide nip roller 54B (roller 3) and the second feeding nip roller 50A (roller 4) become the nip released state.

In the control of the basic action, when the front end of the second photographic paper A passes through the second guide nip roller 54B (roller 3) which is in the nip released state, the second guide nip roller 54B (roller 3) is controlled so that the distance between the second guide nip roller 54B (roller 3) and the flatter guide 40 is more than 0.7±0.2 mm.

In the control of the basic action, after the front end of the photographic paper A passes through the second guide nip roller 54B (roller 3) in the nip released state before passing through the second feeding nip roller 50B (roller 4) in the nip released state, the second guide nip roller 54B (roller 3) is controlled so as to move the state in which the second guide nip roller 54B (roller 3) nips the photographic paper A. When the second guide nip roller 54B (roller 3) nips the photographic paper A, the action speed of the second guide nip roller 54B (roller 3) is set to not more than 6.5 mm/s.

In the control of the basic action, when the front end of the photographic paper A passes through the second feeding nip roller 50B (roller 4) which is in the nip released state, the second feeding nip roller 50B (roller 4) is controlled so that the distance between the second feeding nip roller 50B (roller 4) and the driving roller 44B is more than 0.5 mm.

In the control of the basic action, when the second guide nip roller 54B (roller 3) and the second feeding nip roller 50B (roller 4) are in the nip state, the exposure processing is performed, and the nip releasing action is performed after the back end of the photographic paper A passes through the exposure point P.

Then, the control of the basic action and the control of the special action in the sub-scanning soft nip control will be described referring to FIG. 7 to FIGS. 11A and 11B.

The control of the basic action in the sub-scanning soft nip control is performed according to the timing chart illustrated in FIG. 7.

As shown in the timing chart of FIG. 7, the series of control action cycle from the rotation of the pulse motor 66 to the stop of the pulse motor 66 is intermittently repeated four times to perform the processing to one photographic paper A.

That is to say, in the control of the basic action, first action (1), second action (2), third action (3), and fourth action (4) are intermittently performed.

The first action (1) is the nip set action of the carrying-in nip mechanism 46. The first action (1) is performed, when the predetermined period T1 elapses after the exposure entrance sensor 78 detects the passage of the front end of the photographic paper A. The second action (2) is the nip set action of the carrying-out nip mechanism 48. The second action (2) is performed, when the predetermined period T2 elapses after the immediately before exposure position sensor 80 detects the passage of the front end of the photographic paper A. The third action (3) is the nip releasing action of the carrying-in nip mechanism 46. The third action (3) is performed, when the predetermined period T3 elapses after the exposure entrance sensor 78 detects the passage of the back end of the photographic paper A. The fourth action (4) is the nip releasing action of the carrying-out nip mechanism 48. The fourth action (4) is performed, when the predetermined period T4 elapses after the immediately before exposure position sensor 80 detects the passage of the back end of the photographic paper A.

The predetermined periods T1, T2, T3, and T4 can be adjusted by arbitrary rewriting each time period stored in the control unit 67.

A first action interval (period in which actions are stopped) is set between the first action (1) and the second action (2). A second action interval (period in which actions are stopped) is set between the second action (2) and the third action (3). A third action interval (period in which actions are stopped) is set between the third action (3) and the fourth action (4). A fourth action interval (period in which actions are stopped) is set between the fourth action (4) and the first action (1).

The first action interval, the second action interval, the third action interval, and the fourth action interval are determined in a single uniform way by resist linear speed, exposure linear speed, a cut length of the photographic paper A (length in the feeding direction), and the interval between the photographic papers A sequentially fed respectively.

In order to prevent action interfere, a conditional expression of feeding interval between the photographic papers A sequentially fed becomes $P>R+Q$. Where P is the feeding interval between the photographic papers A, R is a roller pitch between the first feeding nip roller 50A and the second feeding nip roller 50B, and Q is the distance in which the photographic paper A is fed for a period between the fourth action (4) and the first action (1) shown in FIG. 7.

In order to prevent the action interfere, the conditional expression of a minimum cut length of the photographic papers A minimum length in the feeding direction of the photographic paper A to which the exposure processing can be performed) becomes S>U. Where S is the minimum cut length of the photographic paper A and U is the distance in which the photographic paper A is fed for a period between the second action (2) and the third action (3) shown in FIG. 7.

In the control of the basic action, the first action interval, the second action interval, and the third action interval are changed by the so-called paper interval anomaly between the photographic papers A sequentially fed.

In the control of the special action in the sub-scanning soft nip control, the anomaly is detected by monitoring the first action interval, the second action interval, and the third action interval. In each of the first action (1), the second action (2), the third action (3), and the fourth action (4), in the case where start timing of the next action is generated before the action is completed by adjustment failure or action anomaly, error stop or serial processing is not performed, but continuous driving processing is caused to be performed and the control in which delay of action completion is minimized is performed. In the case where the adjustment failure or the action anomaly is generated, it is desirable to provide means for informing an operator of running information or for giving warning to the operator.

Specific contents of control of the special action in the sub-scanning soft nip control will be described below.

Figure 8A:
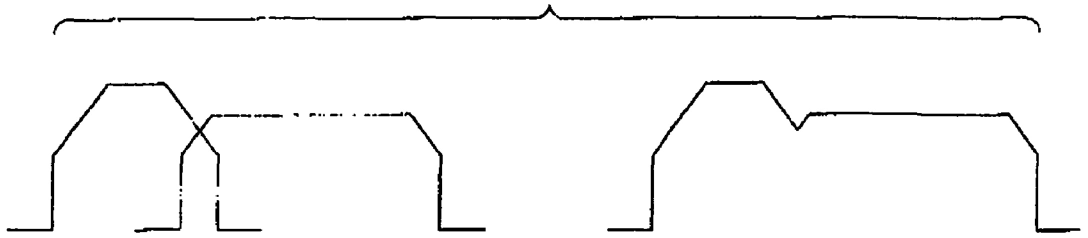
FIGS. 8A and 8B are a timing chart showing control of special action which is performed in the case where start timing of second action (2) is generated before first action (1) is completed in the drive controlling section for controlling each roller of the sub-scanning feeding unit according to the image recording apparatus of the invention.
Figure 8B:
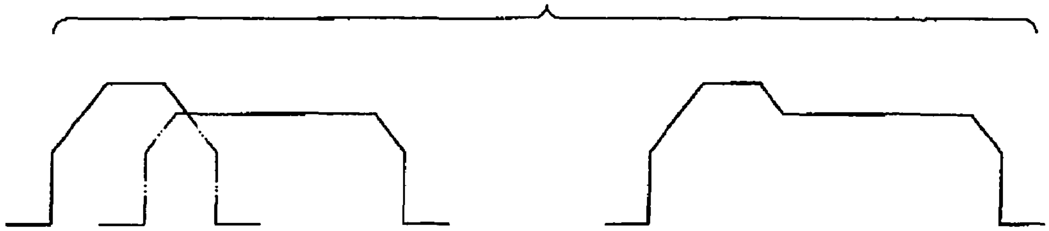

In the sub-scanning soft nip control, in the case where the start timing of the second action (2) is generated before the first action (1) is completed, as illustrated in FIG. 8A, when the first action (1) is in the deceleration action state, the first action (1) continues deceleration action, or the first action (1) is changed to acceleration action to migrate to the driving speed of the next action. As illustrated in FIG. 8B, when the first action (1) is in the state of the constant-speed action, the first action (1) immediately enters the deceleration action to migrate to the driving speed of the next action.

In the above control of the special action, the pulse motor 66 is driven by the sum total of the number of pulses driving the pulse motor 66 in the first action (1) and the number of pulses driving the pulse motor 66 in the second action (2).

Figure 9A:
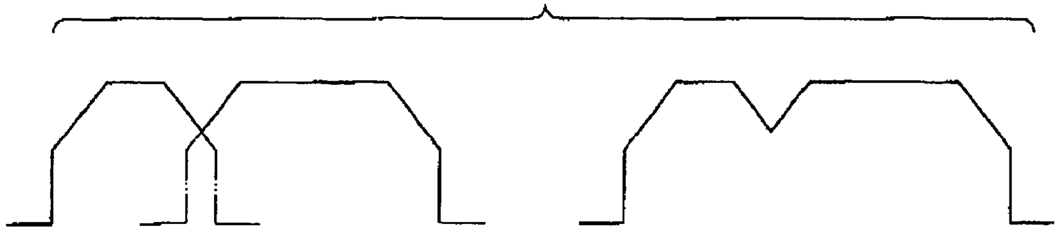
FIGS. 9A and 9B are a timing chart showing the control of the special action which is performed in the case where start timing of third action (3) is generated before the second action (2) is completed in the drive controlling section for controlling each roller of the sub-scanning feeding unit according to the image recording apparatus of the invention.
Figure 9B:
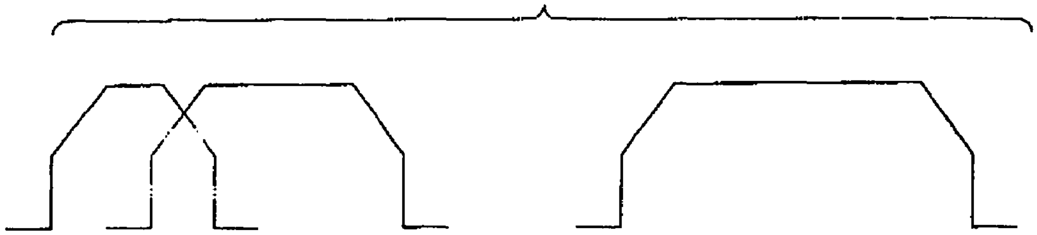

In the sub-scanning soft nip control, in the case where the start timing of the third action (3) is generated before the second action (2) is completed, as illustrated in FIG. 9A, when the second action (2) is in the deceleration action state, the second action (2) continues deceleration action, or the second action (2) is changed to the acceleration action to migrate to the driving speed of the next action. As illustrated in FIG. 9B, when the second action (2) is in the state of the constant-speed action, the second action (2) maintains the driving speed without accelerating or decelerating the action.

In the above control of the special action, the pulse motor 66 is driven by the sum total of the number of pulses driving the pulse motor 66 in the second action (2) and the number of pulses driving the pulse motor 66 in the third action (3).

Figure 10A:
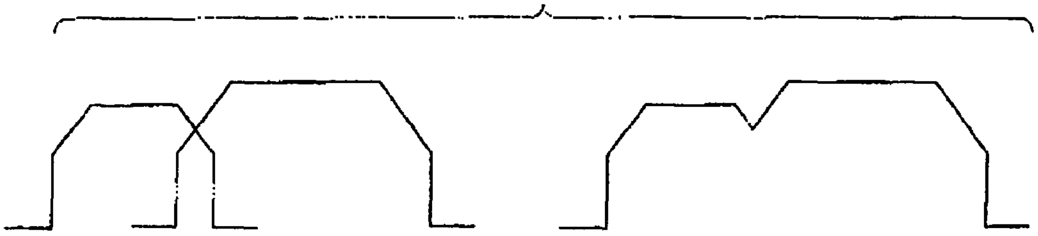
FIGS. 10A and 10B are a timing chart showing the control of the special action which is performed in the case where start timing of fourth action (4) is generated before the third action (3) is completed in the drive controlling section for controlling each roller of the sub-scanning feeding unit according to the image recording apparatus of the invention.
Figure 10B:
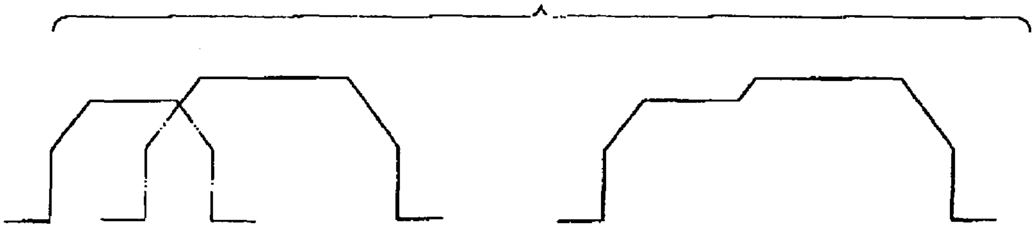

In the sub-scanning soft nip control, in the case where the start timing of the fourth action (4) is generated due to the reason that the speed of the exposure potion is too fast before the third action (3) is completed, as illustrated in FIG. 10A, when the third action (3) is in the deceleration action state, the third action (3) is changed to the acceleration action to migrate to the driving speed of the next action. As illustrated in FIG. 10B, when the third action (3) is in the state of the constant-speed action, the third action (3) is immediately changed to the acceleration action to migrate to the driving speed of the next action.

In the above control of the special action, the pulse motor 66 is driven by the initialization pulse number P4 from the detection of the origin by the means for detecting the origin (not shown) provided in the pulse motor.

Figure 11A:
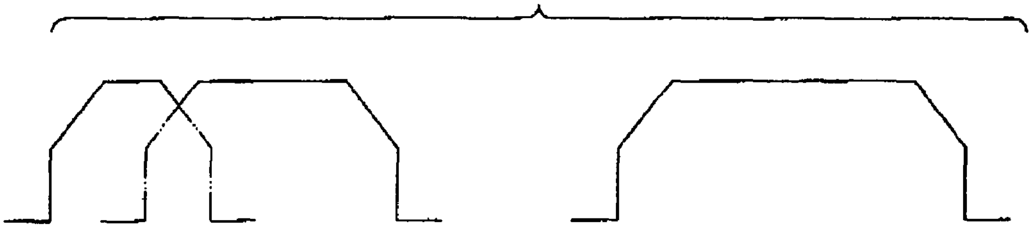
FIGS. 11A and 11B are a timing chart showing the control of the special action which is performed in the case where start timing of the first action (1) is generated before the fourth action (4) is completed in the drive controlling section for controlling each roller of the sub-scanning feeding unit according to the image recording apparatus of the invention.

In the sub-scanning soft nip control, in the case where the start timing of the first action (1) is generated before the fourth action (4) is completed and before the means for detecting the origin (not shown) provided in the pulse motor 66 detects the origin, as illustrated in FIG. 11A, the first action (1) maintains the driving speed without accelerating or decelerating the action.

In the above control of the special action, the pulse motor 66 is driven by the initialization pulse number P4 from the detection of the origin by the means for detecting the origin (not shown) provided in the pulse motor. In addition, the pulse motor 66 is further driven by the number of pulses driving the pulse motor 66 in the first action (1).

Figure 11B:
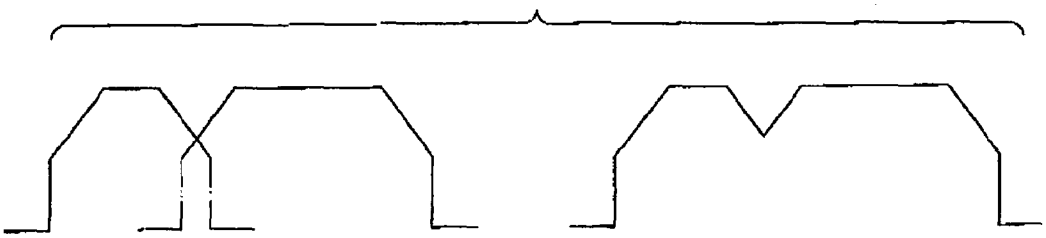

In the sub-scanning soft nip control, in the case where the start timing of the first action (1) is generated before the fourth action (4) is completed and after the means for detecting the origin (not shown) provided in the pulse motor 66 detects the origin, as illustrated in FIG. 11B, when the first action (1) is in the acceleration or deceleration action state, the first action (1) is changed to the acceleration action to migrate the driving speed of the next action.

In the control of the special action, the pulse motor 66 is driven by the number of origin moving remaining pulses (the number of pulses in which the number of pulses moved from the origin is subtracted from the initialization pulse number P4). In addition, the pulse motor 66 is further driven by the number of pulses driving the pulse motor 66 in the first action (1).

In the above control of each special action in the sub-scanning soft nip control, in the case where a plurality of overlaps between action states are simultaneously generated, it is possible to perform each control of the corresponding special action described above.

In the special action, in the case where the action interference (overlap of action timing) shown in FIGS. 8A and 8B to FIGS. 11A and 11B is generated, pulse interpolation or target value fixing action is performed, i.e. the action is continued to the target value without changing the target value of the next action.

For example, in the control of the special action, each action migrates to the next action by performing the adjustment and the change such that the first action interval, the second action interval, the third action interval, and the fourth action interval (action intervals includes the predetermined period T1, the predetermined period T2, the predetermined period T3, and the predetermined period T4 respectively) are omitted if necessary.

In the control of the special action, in the case where the action interference is generated, the actions including the next action are controlled so as to be performed in a minimum time while the driving pulse and the speed are maintained. When the timing of the next action start comes, the action immediately migrates to the pulse speed of the next action.

According to the control of the special action in which the control is performed in the above-described manner, when the first and second feeding nip rollers 50A and 50B or the first and second guide nip rollers 54A and 54B perform the predetermined action in which the first and second feeding nip rollers 50A and 50B or the first and second guide nip rollers 54A and 54B softly nip the photographic paper A or softly release the nip state, the time for decreasing the ascent/descent speed to release the shock can be secured.

In the sub-scanning soft nip control, in the case where the action interference is generated, the whole of the control actions is not stopped as the error generation, but the processing of the image recording is continued by migrating to the special action, so that the action of the image recording apparatus can be stabilized.

In the image recording apparatus, in the case where the overlap of the action timing is generated, the region having the trouble with the action (region to be improved) can be specified from overlap information (information which action interval generates the overlap) in the image recording apparatus.

For example, in the case where the action interference in which the fourth action (4) and the first action (1) overlap one another is generated, the problem that the distance between the photographic papers A sequentially fed is too narrow can be specified. Further, in the case where the action interference in which the second action (2), the third action (3), and the fourth action (4) overlap one another is generated, the problem that the feeding linear speed is too fast in the sub-scanning feeding unit 28 can be specified.

In the image recording apparatus, the information on the region to be improved can be specified as the region having the trouble with the action from the overlap information which action interval generates the overlap, and means for displaying the information on the region to be improved on a display or the like is provided to urge the improvement. That is to say, when the region which largely departs from a design specification is extracted and corrected, subsequently, the photographic paper A in which the anomalous image is formed can be prevented from wasting.

Fine adjustment means in the sub-scanning feeding unit 28 of the image recording apparatus 10 will be described below. The adequate exposure processing can be performed by the fine adjustment means corresponding to the error of machine accuracy (assembly accuracy, accuracy of component, and the like) concerning the carrying-in nip mechanism 46, carrying-out nip mechanism 48, the first cam 68, and the second cam 70 and the condition depending on a kind of paper to be exposed (thickness of the paper or the like).

In the fine adjustment means, for example, the correction of the shift from the design value caused by the variation in the component accuracy is performed by correcting the action timing.

In the case where the action timing is corrected, while the action timing is shifted at the predetermined interval, the processing of the image recording is performed to select the photographic paper A, in which the proper image is formed, from the polarity of photographic papers A in which the image is formed. The action timing in the selected photographic papers A in which the proper image is formed is determined as the optimum action timing. The image recording apparatus can be adjusted simply and rapidly so that the optimum action timing is performed.

Since the adjustment of the optimum action timing is changed by the thickness of the photographic papers A or the curl properties, the optimum action timing is adjustably set in each magazine ID which stores the photographic paper A and is installed in the image recording apparatus, or the optimum action timing is adjustably set in each kind of the surface the photographic papers A or in each paper width of the photographic papers A.

In the fine adjustment means, the initial value of the fine adjustment shown in the following Table 1 can be set as specific data of the fine adjustment. There is a possibility that the initial value of the fine adjustment is influenced by the kind of the photographic papers A (kind of surface such as supreme or standard weight), so that the fine adjustment has the initial value in each magazine ID.

TABLE 1

| Sign | Description | Unit | Initial value | Adjustment range | Remarks |
|---|---|---|---|---|---|
| T2 | Second action (2) start timing | 0.1 (mm) | 8.2 | 0 to 50 | Release height is variable when the photographic paper passes through on the carrying-out nip mechanism side |
| T3 | Third action (3) start timing | 0.1 (mm) | 14.7 | 0 to 50 | Release height is variable when the photographic paper passes through on the carrying-in nip mechanism side |
| P1 | First action (1) driving pulse | 1 (pulse) | 267 | 0 to 500 | Release height is variable when the photographic paper passes through on the carrying-out nip mechanism side |
| P4 | Fourth action (4) stop pulse | 1 (pulse) | 133 | 10 to 250 | Nip releasing position during standby |

Even if the number of pulses is caused to be variable, the sum of P1+P2 is maintained at 800 pulses (both nip positions). A height of the first guide nip roller 54A depends on the mechanical accuracy and adjustment (depending on timing, the photographic papers A passes through while the first guide nip roller 54A is stopped). The change in the number of driving pulses gives offset to the setting of the action timing in the next process, attention is required. In the case where the fine adjustment value is largely changed, the image recording apparatus becomes the setting entering the control of the special action.

The image recording apparatus 10 is configured to directly operate the input of the fine adjustment value, and the image recording apparatus 10 includes means for improving operational ease of the initial value input of the fine adjustment.

In the means for improving the operational ease of the initial value input of the fine adjustment, the print having the proper timing is selected from the prints for adjustment which is made by shifting the fine adjustment value at constant interval, and the fine adjustment value is determined to reflect the fine adjustment value on a table for control. The reflection of the fine adjustment value on the table is configured so that the direct input, the print specification input, fixing ID, and all ID can be selected.

The print for adjustment is a sample of a flameless gray print made by the image recording apparatus 10. In the print for adjustment, No. is described by back print or front print in the range in which a front print area does not influence discrimination of the unevenness, and signage in which the front end and the back end of the print are identified is made. As shown in Table 2, an output size of the print is formed so that the paper feeding length (L) can be selected within the range of an apparatus corresponding length.

TABLE 2

| Sign | Content | Unit | Initial value | Fine adjustment range | Remarks |
|---|---|---|---|---|---|
| L | Print length | 0.1 mm | 152.0 | 82.5 to 457.0 | |

In the means for improving the operational ease of the initial value input of the fine adjustment, the frameless gray print is outputted at timing shown in the following Table 3.

TABLE 3

| Sign | Action | No. 1 | No. 2 | No. 3 | No. 4 | No. 5 | No. 6 | No. 7 | No. 8 | No. 9 |
|---|---|---|---|---|---|---|---|---|---|---|
| T2 | Second action (2) start timing | 4.2 | 5.2 | 6.2 | 7.2 | 8.2 | 9.2 | 10.2 | 11.2 | 12.2 |
| T3 | Third action (3) start timing | 10.7 | 11.7 | 12.7 | 13.7 | 14.7 | 15.7 | 18.7 | 17.7 | 18.7 |

The samples of the frameless gray print made at timing shown in Table 3 are made, when the timing of separation or landing performed by the soft nip control is varied every 1 mm within ±4.0 with reference to a design value No. 5 print.

In the samples of the frameless gray print made at timing described above, the images in the range from the front end of each print to 40 mm are compared with one another, the print No in which a degree of the unevenness is optimum is selected, and the timing T2 of the selected print No is selected as the optimum fine adjustment value.

Similarly, the images in the range from the back end of each print to 40 mm are compared with one another, the print No in which a degree of the unevenness is optimum is selected, and the timing T3 of the selected print No is selected as the optimum fine adjustment value.

In the image recording apparatus 10, the selected timing T2 and timing T3 are inputted to the control unit 67 from an input device (not shown) to be stored in a memory of the control unit 67 and utilized for the soft nip control.

According to the image recording apparatus of the invention, in the case where the photographic paper enters and leaves each roller, the clearance (separation distance) is set so that the end portion of the photosensitive material does not collide with the roller when the separating action is performed so as to release the nip state. Further, when the photosensitive material is nipped or released from the nip state, the action speed is optimized so that throughput capacity is not decreased within the range in which the variation in load does not become the problem. As a result, the image recording apparatus has the advantage in which the image recording can be performed well.

What is claimed is:

1. An image recording apparatus in which scanning exposure is performed to a sheet-like photosensitive material at an exposure position with light to record an image, the image recording apparatus comprising:

a first feeding nip roller which is arranged on an upstream side of the exposure position in a feeding direction and attached while the first feeding nip roller is movable between a nip state and a nip released state, the first feeding nip roller feeding the photosensitive material;

a first guide nip roller which is arranged between the exposure position and the first feeding nip roller and attached while the first guide nip roller is movable between the nip state and the nip released state, the first guide nip roller suppressing a rise of the photosensitive material;

a second feeding nip roller which is arranged on a downstream side of the exposure position in the feeding direction and attached while the second feeding nip roller is movable between the nip state and the nip released state, the second feeding nip roller feeding the photosensitive material;

a second guide nip roller which is arranged between the exposure position and the second feeding nip roller and attached while the second guide nip roller is movable between the nip state and the nip released state, the second guide nip roller suppressing the rise of the photosensitive material; and a drive controlling section which moves the first feeding nip roller, the first guide nip roller, the second feeding nip roller, or the second guide nip roller to the nip state and the nip released state, the drive controlling section setting ascent/descent speed W to a value determined from an equation of W=V×0.004/tan θ, where W is a maximum value of ascent/descent speed when the first feeding nip roller, the first guide nip roller, the second feeding nip roller, or the second guide nip roller comes into contact with the photosensitive material or separates from the photosensitive material, θ is an exposure angle, and V is exposure feeding linear speed.

2. An image recording apparatus in which scanning exposure is performed to a sheet-like photosensitive material at an exposure position with light to record an image, the image recording apparatus comprising:

a first feeding nip roller which is arranged on an upstream side of the exposure position in a feeding direction and attached while the first feeding nip roller is movable between a nip state and a nip released state, the first feeding nip roller feeding the photosensitive material;

a first guide nip roller which is arranged between the exposure position and the first feeding nip roller and attached while the first guide nip roller is movable between the nip state and the nip released state, the first guide nip roller suppressing a rise of the photosensitive material;

a second feeding nip roller which is arranged on a downstream side of the exposure position in the feeding direction and attached while the second feeding nip roller is movable between the nip state and the nip released state, the second feeding nip roller feeding the photosensitive material;

a second guide nip roller which is arranged between the exposure position and the second feeding nip roller and attached while the second guide nip roller is movable between the nip state and the nip released state, the second guide nip roller suppressing the rise of the photosensitive material; and a drive controlling section which moves the first feeding nip roller, the first guide nip roller, the second feeding nip roller, or the second guide nip roller to the nip state and the nip released state, the drive controlling section performing control operation moving the second guide nip roller and the second feeding nip roller to a state in which a gap is provided when a front end of the photosensitive material in exposure passes through positions of the second guide nip roller and the second feeding nip roller which are located on the downstream side of the exposure position in the feeding direction, the gap being capable of passing the front end of the photosensitive material without contacting the second guide nip roller and the second feeding nip roller and being more than an amount of curl of the photosensitive material.

3. An image recording apparatus in which scanning exposure is performed to a sheet-like photosensitive material at an exposure position with light to record an image, the image recording apparatus comprising:

a first feeding nip roller which is arranged on an upstream side of the exposure position in a feeding direction and attached while the first feeding nip roller is movable between a nip state and a nip released state, the first feeding nip roller feeding the photosensitive material;

a first guide nip roller which is arranged between the exposure position and the first feeding nip roller and attached while the first guide nip roller is movable between the nip state and the nip released state, the first guide nip roller suppressing a rise of the photosensitive material;

a second feeding nip roller which is arranged on a downstream side of the exposure position in the feeding direction and attached while the second feeding nip roller is movable between the nip state and the nip released state, the second feeding nip roller feeding the photosensitive material;

a second guide nip roller which is arranged between the exposure position and the second feeding nip roller and attached while the second guide nip roller is movable between the nip state and the nip released state, the second guide nip roller suppressing the rise of the photosensitive material; and a drive controlling section which moves the first feeding nip roller, the first guide nip roller, the second feeding nip roller, or the second guide nip roller to the nip state and the nip released state, the drive controlling section performing control operation moving the first feeding nip roller and the first guide nip roller to a state in which a gap is provided when a back end of the photosensitive material in exposure passes through positions of the first feeding nip roller and the first guide nip roller which are located on the upstream side of the exposure position in the feeding direction, the gap being capable of passing the back end of the photosensitive material without contacting the first feeding nip roller and the first guide nip roller and being more than an amount of curl of the photosensitive material.

4. An image recording apparatus in which scanning exposure is performed to a sheet-like photosensitive material at an exposure position with light to record an image, the image recording apparatus comprising:

a first feeding nip roller which is arranged on an upstream side of the exposure position in a feeding direction and attached while the first feeding nip roller is movable between a nip state and a nip released state, the first feeding nip roller feeding the photosensitive material;

a first guide nip roller which is arranged between the exposure position and the first feeding nip roller and attached while the first guide nip roller is movable between the nip state and the nip released state, the first guide nip roller suppressing a rise of the photosensitive material;

a second feeding nip roller which is arranged on a downstream side of the exposure position in the feeding direction and attached while the second feeding nip roller is movable between the nip state and the nip released state, the second feeding nip roller feeding the photosensitive material;

a second guide nip roller which is arranged between the exposure position and the second feeding nip roller and attached while the second guide nip roller is movable between the nip state and the nip released state the second guide nip roller suppressing the rise of the photosensitive material; and a drive controlling section which moves the first feeding nip roller, the first guide nip roller, the second feeding nip roller, or the second guide nip roller to the nip state and the nip released state, the drive controlling section performing control operation moving the first guide nip roller to the nip state before a front end of the photosensitive material passes through a position of the first guide nip roller which is located on the upstream side of the exposure position in the feeding direction.

5. An image recording apparatus in which scanning exposure is performed to a sheet-like photosensitive material at an exposure position with light to record an image, the image recording apparatus comprising:

a first feeding nip roller which is arranged on an upstream side of the exposure position in a feeding direction and attached while the first feeding nip roller is movable between a nip state and a nip released state, the first feeding nip roller feeding the photosensitive material;

a first guide nip roller which is arranged between the exposure position and the first feeding nip roller and attached while the first guide nip roller is movable between the nip state and the nip released state, the first guide nip roller suppressing a rise of the photosensitive material;

a second feeding nip roller which is arranged on a downstream side of the exposure position in the feeding direction and attached while the second feeding nip roller is movable between the nip state and the nip released state, the second feeding nip roller feeding the photosensitive material;

a second guide nip roller which is arranged between the exposure position and the second feeding nip roller and attached while the second guide nip roller is movable between the nip state and the nip released state, the second guide nip roller suppressing the rise of the photosensitive material; and a drive controlling section which moves the first feeding nip roller, the first guide nip roller, the second feeding nip roller, or the second guide nip roller to the nip state and the nip released state, the drive controlling section performing control operation moving the second guide nip roller to the nip state until a back end of the photosensitive material passes through a position of the second guide nip roller which is located on the downstream side of the exposure position in the feeding direction.

6. An image recording apparatus in which scanning exposure is performed to a sheet-like photosensitive material at an exposure position with light to record an image, the image recording apparatus comprising:

a first feeding nip roller which is arranged on an upstream side of the exposure position in a feeding direction and attached while the first feeding nip roller is movable between a nip state and a nip released state, the first feeding nip roller feeding the photosensitive material;

a first guide nip roller which is arranged between the exposure position and the first feeding nip roller and attached while the first guide nip roller is movable between the nip state and the nip released state, the first guide nip roller suppressing a rise of the photosensitive material;

a second feeding nip roller which is arranged on a downstream side of the exposure position in the feeding direction and attached while the second feeding nip roller is movable between the nip state and the nip released state, the second feeding nip roller feeding the photosensitive material;

a second guide nip roller which is arranged between the exposure position and the second feeding nip roller and attached while the second guide nip roller is movable between the nip state and the nip released state, the second guide nip roller suppressing the rise of the photosensitive material; and a drive controlling section which moves the first feeding nip roller, the first guide nip roller, the second feeding nip roller, or the second guide nip roller to the nip state and the nip released state, the drive controlling section performing control operation moving the first feeding nip roller, the first guide nip roller, the second feeding nip roller, and the second guide nip roller so as to be in the nip released when the first feeding nip roller, the first guide nip roller, the second feeding nip roller, or the second guide nip roller are returned to an initial position respectively.

7. An image recording apparatus according to claim 4, wherein the drive controlling section performs control operation moving the second guide nip roller to the nip state until a back end of the photosensitive material passes through a position of the second guide nip roller which is located on the downstream side of the exposure position in the feeding direction.

8. An image recording apparatus according to claim 7 further comprising a first sensor, which is provided on an upstream side of the first feeding nip roller in the feeding direction, for detecting the photosensitive material, wherein on the basis of detection result of the front end of the photosensitive material by the first sensor, the drive controlling section performs nip operation of the first feeding nip roller and the first guide nip roller.

9. An image recording apparatus according to claim 8, wherein, on the basis of detection result of the back end of the photosensitive material by the first sensor, the drive controlling section performs nip release operation of the first feeding nip roller and the first guide nip roller.

10. An image recording apparatus according to claim 8 further comprising a second sensor, which is provided between the first feeding nip roller and the first guide nip roller, for detecting the photosensitive material, wherein on the basis of detection result of the front end of the photosensitive material by the second sensor, the drive controlling section performs nip operation of the second feeding nip roller and the second guide nip roller.

11. An image recording apparatus according to claim 10, wherein, on the basis of detection result of the back end of the photosensitive material by the second sensor, the drive controlling section performs nip release operation of the second feeding nip roller and the second guide nip roller.

* * * * *